United States Patent [19]
Abe et al.

[11] Patent Number: 5,967,628
[45] Date of Patent: Oct. 19, 1999

[54] VEHICULAR BRAKE SYSTEM

[75] Inventors: Youichi Abe, Kariya; Shuichi Yonemura, Anjo, both of Japan

[73] Assignee: Denso Corporation, Kariya, Japan

[21] Appl. No.: 08/998,226

[22] Filed: Dec. 24, 1997

[30] Foreign Application Priority Data

Dec. 27, 1996 [JP] Japan .................................. 8-350807
Jun. 4, 1997 [JP] Japan .................................. 9-146845

[51] Int. Cl.$^6$ .............................. B60T 8/32; B60T 13/60
[52] U.S. Cl. ................... 303/122.12; 188/353; 188/356; 188/358; 303/113.1; 303/114.1; 303/146; 303/116.1; 303/199; 303/12; 303/114.3
[58] Field of Search ................................ 303/89, 113.1, 303/116.1, 113.3, 113.4, 114.1, 114.3, 191, 122.12, 122.13, 122.14, 113.2, 139, 140, 146, 199, 13–15; 188/353, 355, 356, 357, 358, 359; 477/194–198, 901; 192/219.1; 60/545; 701/71, 76, 82, 83

[56] References Cited

U.S. PATENT DOCUMENTS

| | | | |
|---|---|---|---|
| 3,645,352 | 2/1972 | Stark et al. | 188/353 |
| 3,950,946 | 4/1976 | Sakai et al. | 303/12 |
| 4,738,112 | 4/1988 | Nomura et al. | 303/12 |
| 4,930,607 | 6/1990 | Shimamura et al. | |
| 4,953,447 | 9/1990 | Bender | 303/12 |
| 5,129,496 | 7/1992 | Sigi et al. | |
| 5,158,343 | 10/1992 | Reichelt et al. | |
| 5,171,072 | 12/1992 | Machara | |
| 5,209,329 | 5/1993 | Sigi et al. | |
| 5,221,126 | 6/1993 | Inoue | 303/14 |
| 5,586,814 | 12/1996 | Steiner | |
| 5,709,438 | 1/1998 | Isakson et al. | 303/114.1 |
| 5,735,585 | 4/1998 | Koike et al. | 303/191 |
| 5,890,776 | 4/1999 | Sawada | 303/116.1 |

FOREIGN PATENT DOCUMENTS

| | | |
|---|---|---|
| 3518288A1 | 11/1986 | Germany . |
| 52-036265 | 3/1977 | Japan . |
| 62-077271 | 4/1987 | Japan . |
| 4-056669 | 2/1992 | Japan . |
| 4-121260 | 4/1992 | Japan . |
| 4-041109 | 7/1992 | Japan . |
| 6-029011 | 4/1994 | Japan . |
| 8-085428 | 4/1996 | Japan . |
| 1259421 | 1/1972 | United Kingdom . |
| 89/01887 | 3/1989 | WIPO . |

*Primary Examiner*—Douglas C. Butler
*Attorney, Agent, or Firm*—Pillsbury Madison & Sutro LLP

[57] ABSTRACT

When a vacuum booster fails, an pressure amplifying mechanism increases a wheel brake pressure. After that, even when it is detected that the vehicle is brought into a stopped state, the state in which an increased brake fluid pressure is applied to wheel cylinders is held. If a condition for terminating control to maintain a stationary state of the vehicle is satisfied, that is, if a predetermined time period has elapsed since when the vehicle stops, the operation of the pressure amplifying mechanism is stopped to reduce the wheel cylinder pressure.

12 Claims, 10 Drawing Sheets

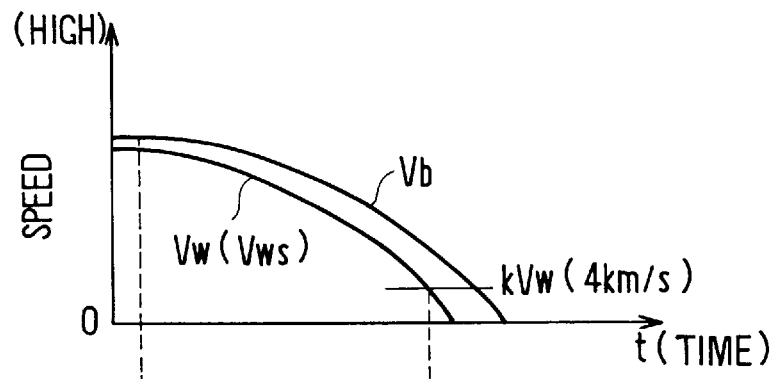
FIG. 4A
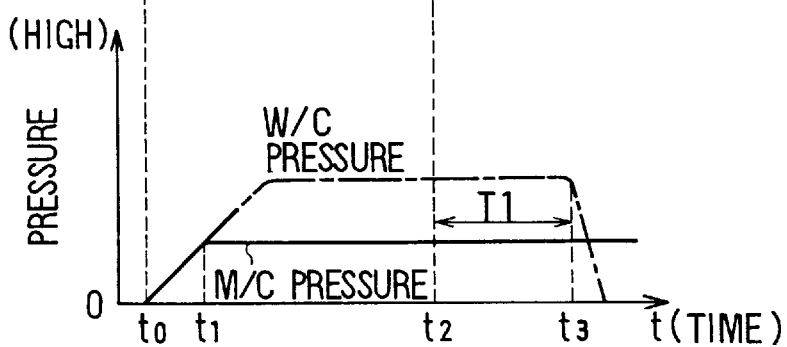
FIG. 4B
FIG. 6
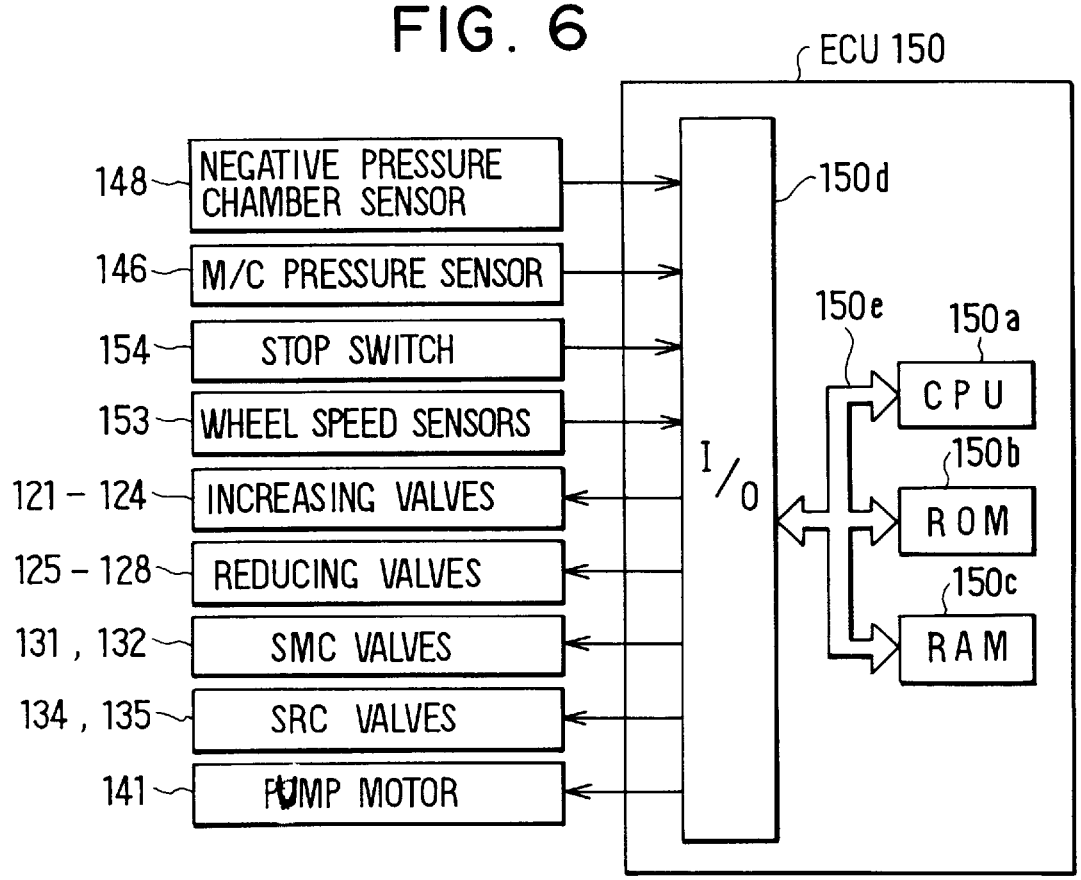

VEHICULAR BRAKE SYSTEM

CROSS REFERENCE TO RELATED APPLICATION

This application is based upon and claims the benefit of priority of Japanese Patent Applications No. H. 8-350807 filed on Dec. 27, 1996 and No. H. 9-146845 filed on Jun. 4, 1997, the contents of which are incorporated herein by reference.

BACKGROUND OF THE INVENTION

1. Field of the Invention

The present invention relates to a vehicular brake system in which a boosting effect of a brake booster for assisting a brake pedal depressing operation to enhance a braking performance is compensated when the brake booster has failed.

2. Related Art

Conventionally, a brake booster for boosting a brake pedal depressing force (for implementing a so-called brake assist operation) is mounted in a vehicle in order to reduce a driver's load to depress the brake pedal.

As a brake booster of this type, there has been known a vacuum booster for boosting the brake pedal depressing force. The vacuum booster applies a boosted large force to a master cylinder by using the difference between an negative pressure of an intake side of an engine for example and an atmospheric pressure. Because the vacuum booster cannot exhibit a desired boosting effect when it fails, there has been discussed lately control for determining whether or not the vacuum booster fails and for executing another brake assist operation for increasing brake fluid pressure by driving a pump and others to enhance a braking force when the vacuum booster is determined to fail.

However, in the above-mentioned technology in which the vacuum booster and another brake assist device are used together, there has been a possibility that the vehicle starts to move by its gravity when the vacuum booster has failed and the vehicle is stopped on a steep slope for example. The reason is that, when the brake assist operation for increasing the brake fluid pressure by driving the pump and the like is finished in response to the vehicle stopping, the braking force due to another brake assist device becomes small rapidly, and because the vacuum booster fails, a driver cannot depress the brake pedal sufficiently to generate braking force for keeping the vehicle resting on the slope.

Accordingly, it is a first object of the present invention to solve the above-mentioned problem by providing a vehicular brake system which can perform favorable brake control at the time of the vehicle stopping by use of another brake assist device when the boosting effect of the brake booster cannot be fully exhibited.

There has been also studied a so-called pressure amplifying assist brake (PAB) for increasing the wheel cylinder pressure by use of a plurality of cut-off valves and a pump even when the vacuum booster has failed. In detail, the wheel cylinder is increased by cutting off a flow path from a master cylinder to the wheel cylinder by a master cut-off valve (SMC valve), by opening a flow path from the master cylinder to an intake side of a pump by a cut-off valve (SRC valve) and by driving the pump in this state.

The magnitude of the pressure increased by the PAB is controlled by the opened/closed state of the SMC valve and the SRC valve or by the driving state of the pump. When the pressure increase is controlled by the opened/closed state of the SMC valve, or more concretely, when the SMC valve is turned OFF (when the flow path is opened) for example, there is a case where pulsations of brake fluid pressure occur.

When it is detected by the fluid pressure sensor that the fluid pressure has been increased (due to the increase of pressure caused by the instantaneous pulsation, not due to the normal increase of pressure) for example, the SMC valve, the SRC valve, the pump and others are driven wastefully to reduce the fluid pressure to an adequate level. That is, there has been a problem that when the pulsations of the fluid pressure occur, inadequate control for decreasing and increasing the fluid pressure is carried out.

Accordingly, it is a second object of the present invention to provide a vehicular brake system which can control the increase/decrease of the brake fluid pressure adequately even when the pulsations of the fluid pressure occur.

SUMMARY OF THE INVENTION

To achieve the first object, in the present invention, a brake fluid pressure generating device generates a first brake fluid pressure due to the boosting effect of a brake booster for boosting a driver's brake pedal depressing force when the driver steps on a brake pedal. A wheel braking force generating device generates a wheel braking force by receiving the first brake fluid pressure via a conduit. Then, when a first detecting device detects a failure or a deterioration of function of the brake booster, a pressure increasing device increases the brake fluid pressure applied to the wheel braking force generating device to a second brake fluid pressure which is higher than the first brake fluid pressure. Further, when a second detecting device detects that the vehicle is stopped (after operation of the pressure increasing device), a holding device holds the brake fluid pressure applied to the wheel braking force generating device to be higher than the first brake fluid pressure until when a predetermined releasing condition is satisfied.

That is, there is a possibility that the braking force is insufficient especially when an external force which might move the vehicle of a stationary state is applied to the vehicle (one example of the external force is gravity acting to the vehicle on a slope) if the operation of the increasing device is finished in response to the vehicle stopping after the increasing device increased the brake fluid pressure so as to compensate the failure or the function deterioration of the brake booster. However, in the present invention, the operation of the increasing device is not stopped until the predetermined releasing condition (i.e. the condition for stopping the operation of the increasing device) in which the vehicle can keep its stationary state is satisfied. In other words, the operation of the increasing device is not finished provided that the vehicle stops. Therefore, because the enough braking force is assured even when the vehicle stops on a slope for example when the brake booster is failed or its function is deteriorated. As a result, the vehicle will not start to move by gravity acting thereto and safety can be enhanced.

It should be noted that the brake fluid pressure held by the holding device may be a pressure of a degree which, at least, can stop the vehicle on a slope and, for example, the second brake fluid pressure may be reduced more or less as the brake fluid pressure held by the holding device.

Also, the brake fluid pressure held by the holding device may be equal to the second brake fluid pressure created by the pressure increasing device. That is, while the brake fluid pressure held by the holding device may be a pressure which can at least keep the vehicle in a stationary state when it stops on a slope for example, it is preferable for the holding device to hold high brake fluid pressure such as the second brake fluid pressure which is established during brake control because the ability for stopping the vehicle is enhanced.

Preferably, the holding device holds the high brake fluid pressure applied to the wheel braking force generating device for a predetermined time period since when the second detecting device detects that the vehicle is in a stationary state. That is, because it is considered that any operation for keeping the vehicle in the stationary state is normally made (e.g. by manipulating a parking brake lever) when the predetermined time period elapses since when the vehicle has stopped, the high brake fluid pressure applied to the wheel braking force generating device is held for the predetermined time period. Thereby, the vehicle will not start to move due to the external force (gravity) acting thereto even if it stops on a slope.

The holding device may hold the high brake fluid pressure applied to the wheel braking force generating device until when an accelerator pedal is depressed to cause the vehicle to start since when the second detecting device detects that the vehicle has stopped. That is, because a force for starting the vehicle is generated when the accelerator pedal is depressed, there is no problem even if the brake fluid pressure is reduced at that time. Further, the brake fluid pressure needs to be reduced in order to start the vehicle smoothly. Therefore, the high wheel cylinder pressure is held since when the vehicle has stopped state until when the accelerator pedal is depressed, which is a period during which the stationary state of the vehicle needs to be maintained. Thereby, the vehicle will not start to move due to the external force (gravity) acting thereto even if it stops on a slope.

The holding device may hold the high brake fluid pressure applied to the wheel braking force generating device until when the driver returns the brake pedal since when the second detecting device detects that the vehicle has stopped. That is, because a period from when the vehicle has stopped till when the brake pedal is returned is considered to be a period during which the driver wants to maintain the stationary state of the vehicle, the high brake fluid pressure applied to the wheel braking force generating device is held during such a period. Thereby, the vehicle will not start to move due to the external force (gravity) acting thereto even if it stops on a slope. It should be noted that the brake pedal is returned at a vehicle starting time or a vehicle parking time when the parking brake is manipulated, for example.

The holding device may hold the high brake fluid pressure applied to the wheel braking force generating device until when the driver operates the parking brake since when the second detecting device detects that the vehicle has stopped. That is, because a period from when the vehicle has stopped till when the parking brake is operated is considered to be a period during which the driver wants to maintain the stationary state of the vehicle, the high wheel cylinder pressure applied to the wheel braking force generating device is held during such a period. Thereby, the vehicle will not start to move due to the external force (gravity) acting thereto even if it stops on a slope.

When the vehicle is provided with an automatic transmission, the holding device may holds the high brake fluid pressure applied to the wheel braking force generating device until when the driver sets a shift lever at the position for parking since when the second detecting device detects that the vehicle has stopped. That is, because a period from when the vehicle has stopped till when the shift lever is set at the position for parking (normally indicated by "P") is considered to be a period during which the driver wants to maintain the stationary state of the vehicle, the high wheel cylinder pressure applied to the wheel braking force generating device is held during such a period. Thereby, the vehicle will not start to move due to the external force (gravity) acting thereto even if it stops on a slope.

To achieve the above-described second object, in the present invention, when a driver operates a brake control member (e.g. a brake pedal) in braking a vehicle, a brake fluid pressure generating device (e.g. a master cylinder) generates a brake fluid pressure in response to the operated state of the brake control member. The brake fluid pressure generated by the brake fluid pressure generating device is transmitted to a wheel braking force generating device (e.g. a wheel cylinder) via a main conduit to generate a wheel braking force. Further, a wheel slippage control device controls slippage of the wheel. A brake assist control device generates a brake fluid pressure which can exhibit a wheel braking force greater than the wheel braking force corresponding to the operating state of the brake control member and controlling brake fluid pressure applied to the wheel braking force generating device by use of the brake fluid pressure generated. A first filter in which the variation of individual data is reflected in the resultant filtered value to some extent carries out filter-processing with respect to a predetermined data signal for performing wheel slippage control. A second filter in which the variation of individual data is less reflected in the resultant filtered value than the first filter carries out filter-processing with respect to a predetermined data signal for performing brake assist control.

For instance, if a filter with respect to the data signal for performing wheel slippage control such as anti-skid control (ABS control) is one which greatly smoothens the variations of individual data of the data signal, a data signal (e.g. a body deceleration) which is largely different from the actually-detected data signal may be outputted as a resultant filtered value by passing through the filter because the filter has a property in which the raw value of the data signal is not picked up. Therefore, wheel slippage control cannot be executed quickly and accurately in correspondence to the condition of the road surface or the wheel slippage state which changes time by time when the resultant filtered value is used therefor. Accordingly, it is desirable to use the first filter in which the variations of individual data is reflected in the resultant filtered value to some extent in order to make use of the data signal which is close to the raw value thereof and is accurate as much as possible when the wheel slippage state is controlled.

However, a driver may feel a sense that something is wrong when brake assist control is started or executed in response to the instantaneous fluctuation of the data signal, because the driver expects that the wheel braking force is stably generated during brake assist control. Therefore, it is desirable to use the second filter in which the variation of individual data is less reflected in the resultant filtered value than the first filter in brake assist control, to smoothen the filtered value as much as possible.

According to the present invention, the first filter is used for the predetermined data signal utilized for performing wheel slippage control so that quick and correct control may be executed by increasing/reducing the brake fluid pressure quickly in correspondence to the road condition or the wheel slippage state which changes time by time. In addition, the second filter is used for the predetermined data signal utilized for performing brake assist control so that brake assist control may be favorably executed without causing a feeling that something is wrong to the driver. That is, in the present invention, brake assist control can be adequately executed by reducing the unnecessary hydraulic pulsations by the use of the second filter in which the variation of individual data is less reflected in the resultant filtered value than the first filter.

According to a first modification of the present invention, when the driver operates the brake control member to brake the vehicle, the brake fluid pressure generating device generates a brake fluid pressure in response to the operating state of the brake control member. The brake fluid pressure generated by the brake fluid pressure generating device is transmitted to the wheel braking force generating device via the main conduit to generate a wheel braking force. Further, a wheel slippage control device controls a wheel slippage state. A brake assist control device generates a brake fluid pressure which can exhibit a wheel braking force greater than the wheel braking force corresponding to the operating state of the brake control member and controlling brake fluid pressure applied to the wheel braking force generating device by use of the brake fluid pressure generated. A first filter in which the variation of individual data is reflected in the resultant filtered value to some extent carries out filter-processing with respect to a vehicle body deceleration for performing wheel slippage control. A second filter in which the variation of individual data is less reflected in the resultant filtered value than the first filter carries out filter-processing with respect to the vehicle body deceleration for performing brake assist control.

As described above, when a filter with respect to the data signal for performing wheel slippage control such as anti-skid control (ABS control) is one which greatly smoothens the variations of individual data, a vehicle-body deceleration which is largely different from the actually-detected vehicle-body deceleration may be outputted as a resultant filtered value by passing through the filter because the filter has a property in which the raw value of the data signal is not picked up. Therefore, wheel slippage control cannot be executed quickly and accurately in correspondence to the condition of the road surface or the wheel slippage state which changes time by time when the resultant filtered value is used therefor. Further, a driver may feel a sense that something is wrong when brake assist control is started or executed in response to the instantaneous fluctuation of the data signal, because the driver expects that the wheel braking force is stably generated during brake assist control.

In the first modification of the present invention, the first filter is used for the vehicle-body deceleration which is one of data signals utilized for performing wheel slippage control so that quick and correct control may be executed by increasing/reducing the brake fluid pressure quickly in correspondence to the road condition or the wheel slippage state which changes time by time. In addition, the second filter is used for signal indicating the vehicle-body deceleration which is one of data signals utilized for performing brake assist control so that brake assist control may be favorably executed without causing a feeling that something is wrong to the driver.

According to a second modification of the present invention, when the driver operates the brake control member to brake the vehicle, brake fluid pressure generating device generates a brake fluid pressure in response to the operating state of the brake control member. The brake fluid pressure is transmitted to the wheel braking force generating device via a main conduit to generate a wheel braking force. Further, a turn tracing control device controls a turning behavior of the vehicle by adjusting wheel braking force of each wheel, independently. A brake assist control device generates a brake fluid pressure which can exhibit a wheel braking force greater than the wheel braking force corresponding to the operating state of the brake control member and controlling brake fluid pressure applied to the wheel braking force generating device by use of the brake fluid pressure generated. A first filter in which the variation of individual data is reflected in the resultant filtered value to some extent carries out filter-processing with respect to a vehicle-body deceleration which is one of the data signals utilized for performing turn tracing control. A second filter in which the variation of individual data is less reflected in the resultant filtered value than the first filter carries out filter-processing with respect to the vehicle-body deceleration which is one of the data signals utilized for performing brake assist control.

The second modification of the present invention is different from the first modification of the present invention in that the turn tracing control device is adopted in the place of the wheel slippage control device. However, because the turn tracing control device controls the turning behavior of the vehicle to advance the vehicle in a desired direction, the same consideration as described above may be taken into with respect to the filter-processing of the vehicle-body deceleration utilized for performing turn tracing control. That is, it is desirable to make use of the vehicle-body deceleration which is close to the raw value thereof and is accurate as much as possible when the turning behavior of the vehicle is controlled. Therefore, the first filter in which the variations of individual data is reflected in the resultant filtered value to some extent is used for the vehicle-body deceleration utilized for performing turn tracing control. To contrary, it is desirable to smoothen the variations of individual vehicle-body deceleration data as much as possible when brake assist control is carried out. Therefore, the second filter in which the variation of individual data is less reflected in the resultant filtered value than the first filter is used for the vehicle-body deceleration utilized for performing brake assist control.

As a result, quick and correct turn tracing control may be executed in correspondence to the road condition or the wheel slippage state which changes time by time and the brake assist may be favorably carried out similarly to the first modification.

Further, according to a third modification of the present invention, when the driver operates the brake control member to brake the vehicle, the brake fluid pressure generating device generates a brake fluid pressure in response to the operating state of the brake control member. A brake booster boosts the operating force applied to the brake control member by the driver by a predetermined times and transmits the boosted operating force to the brake fluid pressure generating device in order that the brake fluid pressure generating device generates a larger brake fluid pressure than a brake fluid pressure caused only by the operating force of the driver. The high brake fluid pressure is transmitted to the wheel braking force generating device via the main conduit to generate a wheel braking force. Further, a brake assist device carries out first brake assist control by generating a brake fluid pressure higher than the brake fluid pressure generated by the brake fluid pressure generating device in response to the operating state of the brake control member when the panic braking operation is made by the driver or when the braking force is not enough because of an insufficient pedal depressing force. The brake assist device carries out second brake assist control by generating a brake fluid pressure higher than the brake fluid pressure corresponding to the operating state of the brake control member when the brake booster fails or its function deteriorates. The brake assist device uses a first filter in which the variations of individual data of a data signal is reflected in the resultant filtered value to some extent to carry out filter-processing with respect to the data signal for performing first brake assist control and uses a second filter in which the variation of individual data of a data signal is less reflected in the resultant filtered value than the first filter to carry out filter-processing with respect to the data signal for performing second brake assist control.

There is a possibility that there is an adverse effect on the braking distance or the passenger feels a sense that something is wrong when second brake assist control is executed or terminated in response to the instantaneous fluctuation of the data signal, which is performed when the brake booster fails or when its function is deteriorated. Further, during first brake assist control which is performed when the panic braking operation is made or when sufficient braking force is not produced because of insufficient depressing force applied to the brake control member by the driver, the state of the brake control member operated by the driver must be correctly and timely determined at all times to carry out first brake assist operation favorably.

In the third modification of the present invention, brake assist control can be made adequately corresponding to each state by using the first filter to carry out filter-processing with respect to the data signal for performing first brake assist control and the second filter to carry out filter-processing with respect to the data signal for performing second brake assist control.

A master cylinder pressure may be adopted as the data signal for performing brake assist control and the like. Accordingly, each control may be favorably performed by using the different filtered values obtained by using different filters to detected master cylinder pressure depending on each control.

BRIEF DESCRIPTION OF THE DRAWINGS

These and other objects, features and characteristics of the present invention will be appreciated from a study of the following detailed description, the appended claims, and drawings, all of which form a part of this application. In the drawings:

FIG. 4A is a graph showing changes of wheel speed and vehicle-body speed and

FIG. 4B is a graph showing changes of brake fluid pressure by the control processing of the first embodiment;

FIG. 6 is a block diagram showing an electrical structure of the sixth embodiment;

DETAILED DESCRIPTION OF THE PREFERRED EMBODIMENTS

Preferred embodiments according to the present invention will be explained below in detail with reference to the drawings.

First Embodiment

The schematic structure of the vehicular brake system will be explained based on FIG. 1 at first. It is noted that the vehicular brake system is equipped with a brake booster and a pressure amplifying mechanism comprising a pump and others in order to carry out brake assist control.

Figure 1:
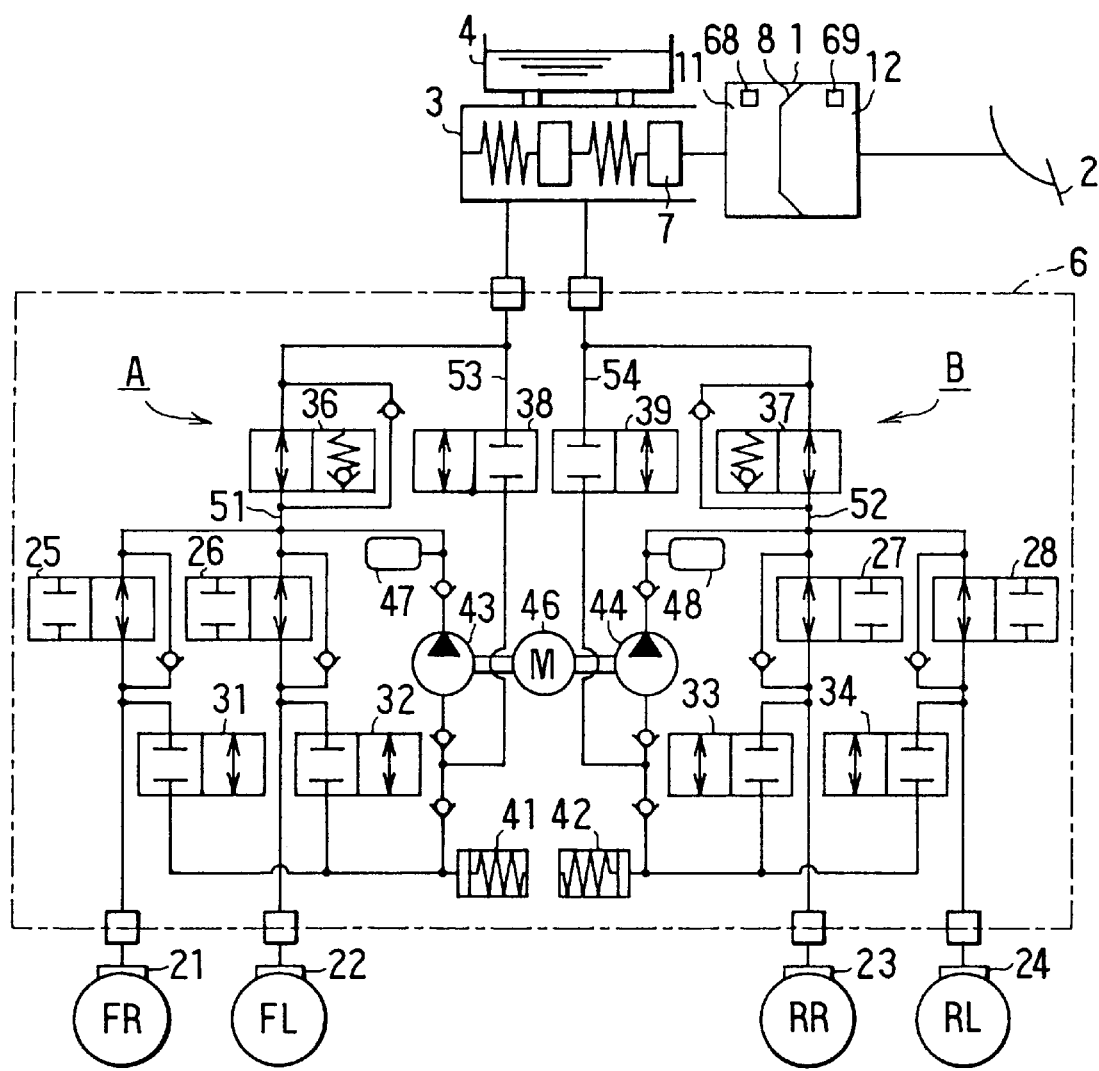
FIG. 1 is a schematic structural diagram showing a vehicular brake system of a first embodiment.

As shown in FIG. 1, the vehicular brake system of the present embodiment has a vacuum booster 1 as a brake booster. The vacuum booster 1 is connected with a brake pedal 2 at its input side and with a tandem type master cylinder 3 at its output side. The master cylinder 3 is connected with a master reservoir 4 and a hydraulic pressure control circuit 6 composed of first and second longitudinal conduit systems A and B.

The brake booster 1 is provided with a vacuum chamber (constant-pressure chamber) 11 and a variable-pressure chamber 12 which are partitioned by a diaphragm 8. The vacuum booster 1 exhibits a boosting effect as the brake pedal 2 is depressed. That is, it increases a force applied to a piston 7 of the master cylinder 3 by utilizing a difference of pressures in the both chambers 11 and 12. A negative pressure (intake negative pressure) generated in an intake manifold of an engine not shown is introduced into the vacuum chamber 11 and the atmospheric pressure is introduced into the variable-pressure chamber 12.

In the hydraulic pressure control circuit 6, a wheel cylinder 21 of the front right (FR) wheel communicates with a wheel cylinder 22 of the front left (FL) wheel via the first conduit system A. Further, a wheel cylinder 23 of the rear right (RR) wheel communicates with a wheel cylinder 24 of the rear left (RL) wheel via the second conduit system B.

The first conduit system A is provided with a known pressure-increasing valve 25 and a pressure-reducing valve 31 for controlling the hydraulic pressure of the wheel cylinder 21 of the wheel FR and with a pressure-increasing valve 26 and a pressure-reducing valve 32 for controlling the hydraulic pressure of the wheel cylinder 22 of the wheel FL. The second conduit system B is provided with a pressure-increasing valve 27 and a pressure-reducing valve 33 for controlling the hydraulic pressure of the wheel cylinder 23 of the wheel RR and with a pressure-increasing valve 28 and a pressure-reducing valve 34 for controlling the hydraulic pressure of the wheel cylinder 24 of the wheel RL.

The structure of the first conduit system A will be further explained.

The first conduit system A is provided with a master cylinder cut-off valve (SMC valve) 36 for communicating/cutting off a fluid path 51 thereof on the side of the master cylinder 3 from each of the pressure-increasing valves 25 and 26. It is also provided with a reservoir 41 for temporarily storing the brake fluid discharged from each of the pressure-reducing valves 31 and 32 and a hydraulic pump 43 for pressurizing and feeding the brake fluid to the fluid path 51. It is also provided with a fluid path 53 for supplying the brake fluid directly from the master cylinder 3 to the hydraulic pump 43 in increasing the brake fluid pressure of the wheel cylinder. A cut-off valve (SRC valve) 38 for communicating/cutting off the fluid path 53 is disposed in the fluid path 53.

The hydraulic pump 43 is driven by a pump motor 46 and serves as a pressure amplifying mechanism together with the SMC valve 36 and the SRC valve 38. The pressure amplifying mechanism can increase the wheel cylinder pressure more than the master cylinder pressure by driving the pump 43 while opening the SRC valve 38 and cutting off the SMC valve 36.

It is noted that an accumulator 47 for suppressing pulsations of the internal hydraulic pressure is provided in the fluid path for discharging the brake fluid from the pump 43.

Similarly to the first conduit system A described above, the second conduit system B is provided with pressure-increasing valves 27 and 28, pressure-reducing valves 33 and 34, a SMC valve 37, a reservoir 42, a hydraulic pump 44, an accumulator 48, a SRC valve 39, fluid paths 52 and 53 and the like at the same locations.

Figure 2:
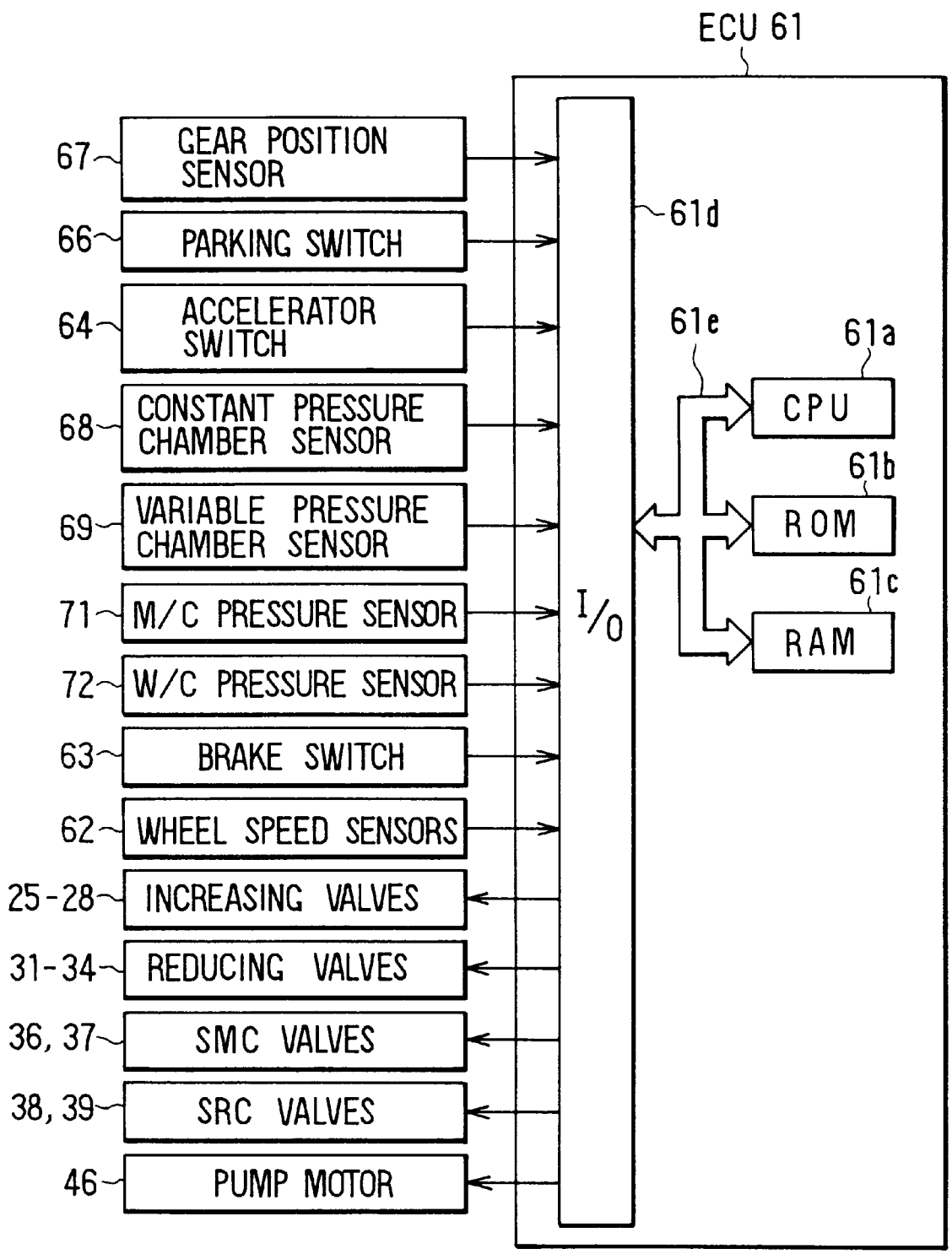
FIG. 2 is a block diagram showing an electrical structure of the first embodiment.

As shown in FIG. 2, an ECU (electric control unit) 61 for controlling the vehicular brake system described above is mainly composed of a microcomputer equipped with a known CPU 61a, a ROM 61b, a RAM 61c, an input/output section 61d, a bus line 61e and the like.

Signals of wheel speed sensors 62 disposed at each wheel which detect wheel speeds thereof, of a brake switch 63 for detecting that the brake pedal 2 has been depressed, of an accelerator switch 64 for detecting that an accelerator pedal not shown is depressed, of a parking switch 66 for detecting that a parking brake lever not shown is pulled, of a gear position sensor 67 for detecting that a shift lever not shown is set at the position for parking in case of a vehicle provided with an automatic transmission, of a constant-pressure chamber pressure sensor 68 for detecting a pressure within the constant-pressure chamber 11 of the vacuum booster 1, of a variable-pressure chamber pressure sensor 69 for detecting a pressure within the variable-pressure chamber 12, of a M/C pressure sensor 71 for detecting the master cylinder pressure, of a W/C pressure sensor 72 for detecting the wheel cylinder pressure and the like are fed to the ECU 61.

The ECU 61 outputs control signals for driving the pressure-increasing valves 25 through 28, the pressure-reducing valves 31 through 34, the SMC valves 36 and 37 and the SRC valves 38 and 39 which are electromagnetic valves, and control actuators such as the pump motor 46.

Next, control processing steps of the present embodiment will be explained based on a flow chart in FIG. 3 and on graphs in FIGS. 4A and 4B.

Figure 3:
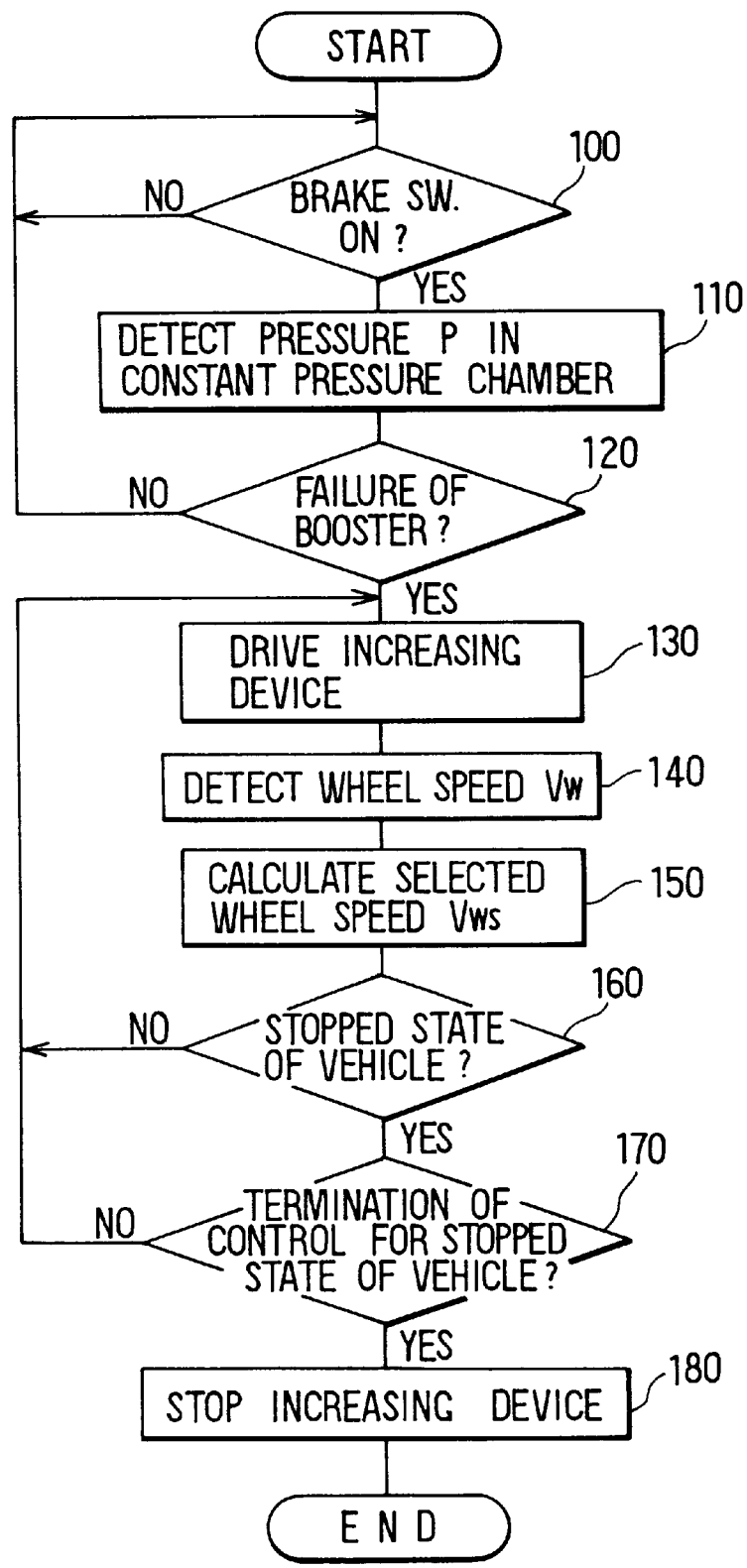
FIG. 3 is a flow chart showing control processing steps of the first embodiment.

At first, it is determined whether or not the brake pedal 2 is being depressed by determining whether or not the brake switch 63 is ON in Step 100 in FIG. 3. When it is determined to be Yes here, the processing advances to Step 110 and when it is determined to be No, the same determination is repeated again.

In Step 110, the pressure (negative pressure) P of the constant-pressure chamber 11 is detected based on the signal from the constant-pressure chamber pressure sensor 68. In the following Step 120, it is determined whether or not the brake booster (V/B) 1 fails by determining whether or not the constant-pressure chamber pressure P which is negative pressure exceeds a determination value kP. That is, when no adequate negative pressure is supplied to the constant-pressure chamber 11, it is determined that the vacuum booster 1 fails. When it is determined to be Yes here, the processing advances to Step 130 and when it is determined to be No, the processing returns to Step 100 described above.

It is noted that a deterioration of the function of a degree which will not invite the failure of the brake booster 1 may be also detected by setting the level of the determination value low, i.e. by setting the value for discriminating the deterioration of the function to be lower than the value of kP. The brake fluid pressure may be amplified in the same manner with the case of the failure of the brake booster 1 in response to this result (however, the degree of amplification of the pressure is small).

Because the brake booster 1 is determined to be failed in Step 130, a pressure amplifying mechanism (an increasing device) is started to complement the boosting effect of the vacuum booster 1. That is, the amplification of the brake fluid pressure is carried out by the pressure amplifying mechanism. Specifically, the SMC valves 36 and 37 are closed to cut off the fluid paths 51 and 52 extending from the master cylinder 3 to the wheel cylinders 21 through 24 and the SRC valves 38 and 39 are opened to communicate the fluid paths 53 and 54 from the master cylinder 3 to the intake side of the hydraulic pumps 43 and 44. In this state, the hydraulic pumps 43 and 44 are driven by turning on the pump motor 46. Thereby, the wheel cylinder pressure may be increased while complementing the boosting effect of the failed vacuum booster 1.

In the following Step 140, wheel speeds Vw of the four wheels is detected based on the signals from wheel speed sensors 62 disposed at each of four wheels. In the following Step 150, a speed value Vw which corresponds to a vehicle-body speed Vb is selected among the wheel speeds Vw of the four wheels and is set as a selected wheel speed Vws. For example, an average value or a maximum value of the wheel speeds Vw of the four wheels is set as the selected wheel speed Vws.

In the following Step 160, it is determined whether or not the vehicle has stopped by determining whether or not the selected wheel speed Vws is less than a determination value kVw (e.g. 4 km/s). When it is determined to be Yes here, the processing advances to Step 170 and when it is determined to be No on the other hand, the processing returns to Step 130 described above.

In Step 170, it is determined whether or not a condition for terminating control for a stopped (stationary) state of the vehicle, i.e. control for preventing the braking force from being insufficient at the time of the vehicle stopping is satisfied. Specifically, it is determined whether or not a predetermined time T1 has elapsed since when the vehicle has stopped. When it is determined to be Yes here, the processing advances to Step 180 and when it is determined to be No on the other hand, the processing returns to Step 130 described above.

Because the condition for terminating control for the stopped state of the vehicle is met, the operation of the increasing device is stopped (released) in Step 180 and the processing is ended. In detail, the SMC valves 36 and 37 are opened to communicate the fluid path 51 and 52 from the master cylinder 3 to the wheel cylinders 21 through 24, the SRC valves 38 and 39 are closed to cut off the fluid path 53 and 54 from the master cylinder 3 to the intake side of the hydraulic pumps 43 and 44, and the hydraulic pumps 43 and 44 are stopped by turning off the pump motor 46. Thereby, control for increasing the wheel cylinder pressure (pressure amplifying control) carried out for complementing the boosting effect of the failed vacuum booster 1 may be stopped. As a result, the amplification of the wheel cylinder pressure may be stopped and the braking force of the wheel may be reduced after the predetermined time T1 since when the vehicle has stopped by the above-mentioned processing.

Next, an effect obtained by the present embodiment will be explained based on FIGS. 4A and 4B.

As shown in FIGS. 4A and 4B, when the brake pedal is depressed at time t0, the wheel speed Vw and the vehicle-body speed Vb gradually drop in response to the depression of the brake pedal 2. If the vacuum booster 1 fails at time t1, the amplification of the wheel cylinder pressure is started by the pressure amplifying mechanism in order to compensate the boosting effect thereof. Accordingly, although the master cylinder pressure (M/C pressure) barely increases (depending on the state of the failure), the wheel cylinder pressure (W/C pressure) increases thereafter.

When the wheel speed Vw (or more specifically, the selected wheel speed Vws) decreases below the determination value kVw at time t2, it is determined that the vehicle is put into the stopped state. The amplification of the wheel cylinder pressure by the pressure amplifying mechanism is stopped and the wheel cylinder pressure is reduced at time t3 at which the predetermined time T1 has elapsed from the determination of the stopped state (made at time t2). That is, the pressure amplifying mechanism (the increasing device) for compensating the boosting effect of the vacuum booster 1 is driven when it is determined that the vacuum booster 1 has failed. Further, when the vehicle is determined to be in the stopped state after that, the operation of the pressure amplifying mechanism (the increasing device) is stopped not simultaneously with such a determination but after an elapse of the predetermined time T1 from the determination. This is because the braking force might become insufficient because of the failure of the vacuum booster 1 when the increasing device is stopped immediately after the vehicle is determined to be stopped. For example, when the vehicle is stopped on a slope, the vehicle may be unable to keep its stationary state by gravity applied thereto. As a countermeasure for that, the increasing device is stopped after the elapse of the predetermined time T1 since the vehicle stops. During such a period, it can be considered that the driver will take any action for maintaining the stopped state of the vehicle like pulling a parking brake lever for example. As a result, the present embodiment can obtain a remarkable effect that the vehicle will not start to move unintentionally even if it stops on a slope and it is very safe even when the vacuum booster 1 fails.

Second Embodiment

Next, a second embodiment will be explained below. However, because only the conditions for terminating control for the stopped state of the vehicle is different from that of the first embodiment, that point will be explained in detail hereinafter.

In the second embodiment, the amplification of the wheel cylinder pressure by the pressure amplifying mechanism described above is continued until when the accelerator pedal (not shown) is depressed to start the vehicle from its stationary state even if the vehicle is detected to be in the stopped state. When it is detected that the accelerator pedal is depressed based on the signal from the accelerator switch 64, the amplification of the wheel cylinder pressure by the pressure amplifying mechanism is stopped to reduce the wheel cylinder pressure. That is, because a force for starting the vehicle is applied when the accelerator pedal is depressed, the vehicle does not move unintentionally even if the brake fluid pressure is reduced at that point of time. In other words, the vehicle will not move by gravity applied thereto even when the vehicle stops on a slope. Further, the brake fluid pressure needs to be reduced in order to start the vehicle smoothly. Therefore, the high wheel cylinder pressure is held until when the accelerator pedal is depressed in the present embodiment.

Thereby, the same effect with the first embodiment described above can by obtained by the second embodiment. Further, because the braking force of the wheel is reduced after the operation for starting the vehicle is started, not reducing it when the predetermined time T1 has elapsed, the safety is enhanced further.

Third Embodiment

Next, a third embodiment will be explained below. However, because only the conditions for terminating control for the stopped state of the vehicle is different from that of the first embodiment, that point will be explained in detail hereinafter.

In the third embodiment, the amplification of the wheel cylinder pressure by the pressure amplifying mechanism described above is continued until when the brake pedal 2 is actually returned by the passenger even if the vehicle is detected to be in the stopped state. That is, when it is detected that the brake pedal 2 is returned based on the signal from the brake switch 63, the amplification of the wheel cylinder pressure by the pressure amplifying mechanism is stopped to reduce the wheel cylinder pressure. In other words, because a period from when the vehicle has stopped till when the brake pedal 2 is returned is considered to be a period during which the passenger wants to maintain the stopped state of the vehicle, the high wheel cylinder pressure is held until when the brake pedal 2 is actually returned.

As a result, the same effect with the first embodiment described above can be obtained by the third embodiment. Further, because the braking force of the wheel is reduced after when the intention of completely stopping the vehicle or of starting the vehicle again is exhibited by the driver, not reducing the braking force of the wheel when the predetermined time T1 has elapsed since when the vehicle has stopped, the safety is enhanced further.

Fourth Embodiment

Next, a fourth embodiment will be explained below. However, because only the conditions for terminating control for the stopped state of the vehicle is different from that of the first embodiment, that point will be explained in detail hereinafter.

In the fourth embodiment, the amplification of the wheel cylinder pressure by the pressure amplifying mechanism described above is continued until when a parking brake lever (not shown) is actually operated (pulled) by a driver even when the vehicle is detected to be in the stopped state. That is, when it is detected that the parking brake lever has been pulled based on the signal from the parking switch 66, the amplification of the wheel cylinder pressure by the pressure amplifying mechanism is stopped to reduce the wheel cylinder pressure.

Because a period from when the vehicle has stopped till when the parking brake lever is pulled is considered to be a period during which the passenger wants to maintain the stopped state of the vehicle, the high wheel cylinder pressure is held until when the parking brake lever is pulled in the present embodiment.

Thereby, the same effect with the first embodiment described above can be obtained by the fourth embodiment. Further, because the braking force of the wheel is reduced after when the operation for completely stopping the vehicle is made, not reducing the braking force of the wheel when the predetermined time T1 has elapsed, the safety is enhanced further.

Fifth Embodiment

Next, a fifth embodiment will be explained below. However, because only the conditions for terminating control for the stopped state of the vehicle is different from that of the first embodiment, that point will be explained in detail hereinafter.

In the fifth embodiment, when the vehicle has an automatic transmission, the amplification of the wheel cylinder pressure by the pressure amplifying mechanism described above is continued until when the driver actually sets a shift lever (not shown) at a position for parking even when the vehicle is detected to be in the stopped state. That is, when it is detected that the lever has been set at the position for parking based on the signal from the gear position sensor 67, the amplification of the wheel cylinder pressure by the pressure amplifying mechanism is stopped to reduce the wheel cylinder pressure.

Because a period from when the vehicle has stopped till when the shift lever is set at the position for parking is considered to be a period during which the driver wants to maintain the stopped state of the vehicle, the high wheel cylinder pressure is held until when the lever is set at the position for parking in the present embodiment.

Thereby, the same effect with the first embodiment described above can be obtained. Further, because the braking force of the wheel is reduced after when the operation for completely stopping the vehicle is made, not reducing the braking force of the wheel when the predetermined time T1 has elapsed, the safety is enhanced further.

It is noted that the present invention is not limited to the above-described embodiments and it may be practiced in various modes within the scope of the appended claims.

For instance, although a vacuum booster 1 using the negative pressure of the engine and the atmospheric pressure has been described as a brake booster in the first through fifth embodiments, one using pressure from another pressure source such as an accumulator may be adopted as the brake booster. Further, a hydro-booster is also applicable as the brake booster.

Although the determination of the failure and the function deterioration of the vacuum booster is made based on the state of the pressure of the constant-pressure chamber in the above-mentioned first through fifth embodiments, various methods other than that such as the following methods (A) through (C) may be adopted:

(A) When the difference (P1–P2) between the pressure P1 in the variable-pressure chamber and the pressure P2 in the constant-pressure chamber is less than a predetermined value, it may be determined that the vacuum booster fails or its function deteriorates.

(B) When a difference (PT–P1) between the atmospheric pressure PT of the outside and the pressure P1 of the variable-pressure chamber is below a predetermined reference value, it may be determined that the vacuum booster fails or its function deteriorates.

(C) When a difference (PT–P2) between the atmospheric pressure PT and the pressure P2 of the constant-pressure chamber is below a predetermined reference value, it may be determined that the vacuum booster fails or its function deteriorates.

While the increasing device composed of the SMC valves 36 and 37, the hydraulic pumps 43 and 44, and the SRC valves 38 and 39 has been exemplified as the pressure amplifying mechanism in the above-mentioned first through fifth embodiments, the following structures (D) and (E) may be adopted for example as long as the wheel cylinder pressure can be increased when the vacuum booster fails or when its function deteriorates.

(D) An arrangement in which a proportioning control valve is inversely connected in the place of the SMC valve, i.e. an arrangement in which the high-pressure side (input side) of the proportioning control valve is connected to a wheel cylinder side and the low-pressure side (output side) thereof is connected to a master cylinder side, may be adopted in the above-mentioned embodiments. In this case, it is desirable to set a split-point pressure of the proportioning control valve as low as possible. The pressure at the high-pressure side is equal to the pressure at the low-pressure side when the pressure applied to the proportioning control valve is less than the split-point pressure. Further, the proportioning control valve controls the pressure at the low-pressure side so that the pressure at the low-pressure side is reduced from the pressure at the high-pressure side with a predetermined rate when the pressure applied thereto exceeds the split-point pressure. Accordingly, the proportioning control valve can be used as the pressure amplifying mechanism along with the hydraulic pump.

(E) It is possible to arrange such that the intake side of the hydraulic pump is connected to the master reservoir 4, not the master cylinder 3, and the SRC valve is disposed on the fluid path connecting the intake side of the hydraulic pump to the master reservoir 4. In this case, because the wheel cylinder pressure is increased by the brake fluid supplied from the master reservoir 4, not enhancing the wheel cylinder pressure by moving the brake fluid between the master cylinder and the wheel cylinder to the wheel cylinder side like the above-mentioned embodiments, it has such advantages that the wheel cylinder pressure may be increased quickly and the braking performance is high.

Although the amplification of the wheel cylinder pressure by the pressure amplifying mechanism has been continued until when the predetermined conditions such as the elapse of a predetermined time T is satisfied since when the vehicle has been determined to be in the stopped state in the first through fifth embodiments, the high wheel cylinder pressure may be maintained by driving the pressure-increasing control valves, instead of amplifying the pressure by the pressure amplifying mechanism. In detail, when the vehicle is determined to be in the stopped state, the high wheel cylinder pressure may be maintained by closing the pressure-increasing control valves while the amplification of the wheel cylinder pressure by the pressure amplifying mechanism is stopped.

Although the high wheel cylinder pressure formed during braking is held as it is until when the predetermined conditions such as the elapse of the predetermined time T is satisfied since when the vehicle has been determined to be in the stopped state in the first through fifth embodiments, the wheel cylinder pressure may be reduced to some degree while maintaining the braking force required to stop the vehicle because it is enough to prevent the unintentional move of the vehicle caused by the lack of the braking force during the stopped state. For instance, the wheel cylinder pressure may be reduced by reducing the driving force of the pump, by controlling the closed state of the SRC valve or by opening the pressure-reducing control valve with a predetermined duty ratio. In this case, because the wheel cylinder pressure is reduced to a certain degree, there is such an advantage that the shock of pressure (to the master cylinder side) caused when the SMC valve is opened in response to the stoppage of the pressure amplifying mechanism may be reduced.

Further, if the function of the vacuum booster has deteriorated due to the fluctuation of the negative pressure of the intake manifold, the amplification of pressure is finished when it is detected that the function of the vacuum booster is recovered, i.e. that the negative pressure or the engine speed (idling speed) is normalized. It is noted that the normalization may be detected from the negative pressure of the vacuum booster or the like.

Although the longitudinal conduit system has been exemplified in the first through fifth embodiments, a diagonal conduit system may be used instead of that.

Sixth Embodiment

Next, a sixth embodiment will be explained. In the vehicular brake system of the sixth embodiment, filters for filtering detected value and the like are changed in correspondence to various controls.

Figure 5:
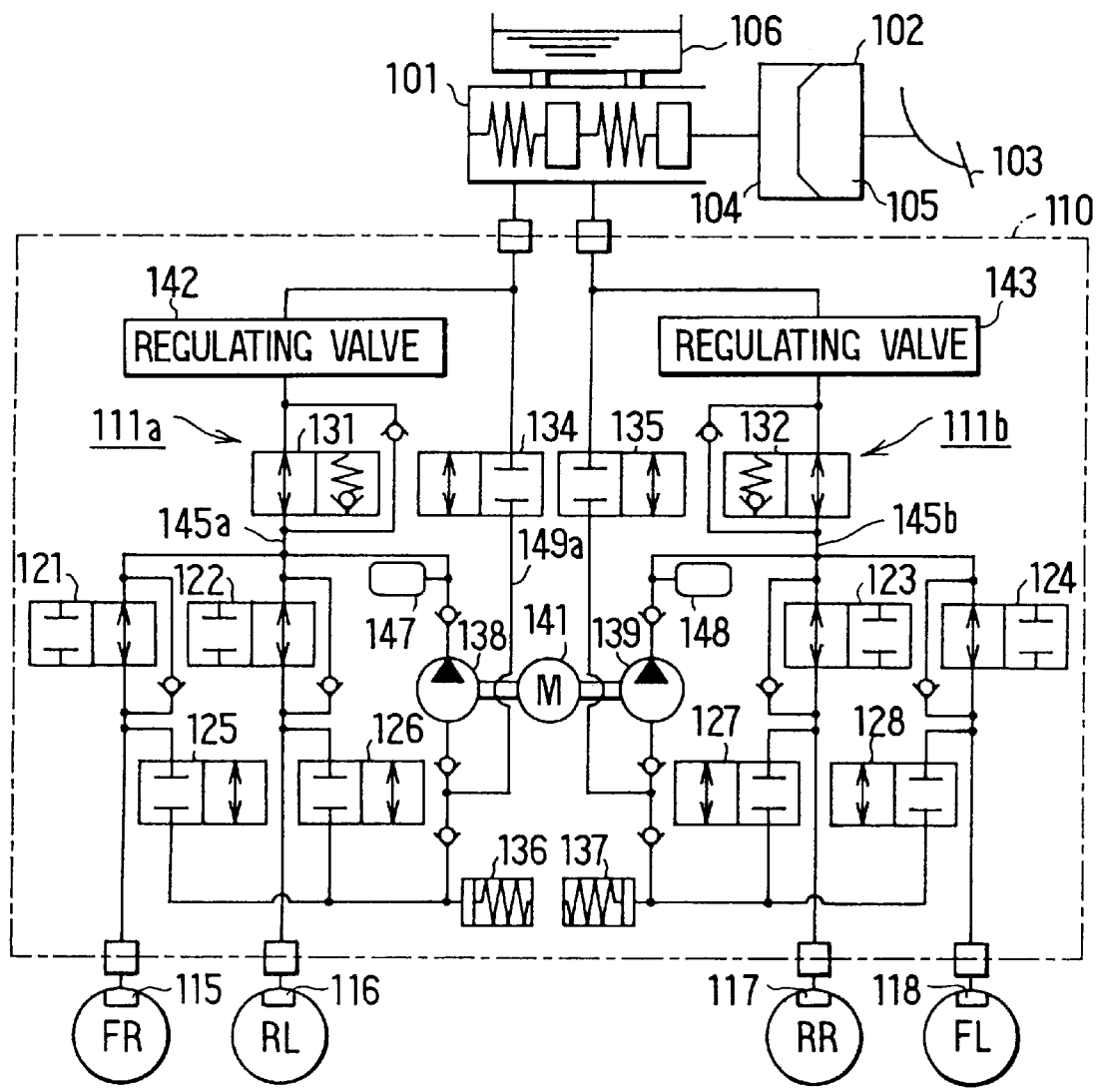
FIG. 5 is a schematic structural diagram showing a vehicular brake system according to a sixth embodiment.

FIG. 5 is a schematic structural diagram of the vehicular brake system which is capable of performing the turn tracing control for controlling the behavior of the vehicle when the vehicle turns, the pressure amplifying assist brake (PAB) for increasing a brake fluid pressure applied to wheel cylinders when a brake booster fails for example, in addition to known anti-skid control (ABS) and traction control (TRC).

As shown in FIG. 5, the vehicular brake system has a tandem type master cylinder 101. A brake pedal 103 is connected to the master cylinder 101 via a brake booster 102 (brake servo system). The brake booster 102 is a so-called vacuum booster which is equipped with a vacuum chamber 104 which is connected with an intake manifold of an engine not shown and to which vacuum is introduced therefrom and a variable pressure chamber 105 to which atmospheric air is introduced. The brake booster 102 boosts the depressing force of the brake pedal 103 by the difference between the pressure in the vacuum chamber 104 and the pressure in the variable pressure chamber 105.

The master cylinder 101 is connected with a master reservoir 106 and a hydraulic pressure control circuit 110 which is composed of two hydraulic X conduit (diagonal conduit) systems for controlling the brake fluid pressure applied to wheel cylinders. The hydraulic pressure control circuit 110 comprises a first fluid conduit system 111a and a second fluid conduit system 111b. In the hydraulic pressure control circuit 110, a wheel cylinder 115 of the front right (FR) wheel communicates with a wheel cylinder 116 of the rear left (RL) wheel via the first fluid conduit system 111a. Further, a wheel cylinder 117 of the rear right (RR) wheel communicates with a wheel cylinder 118 of the front left (FL) wheel via the second fluid conduit system 111b.

The first fluid conduit system 111a is provided with a known pressure-increasing control valve 121 and a pressure-reducing control valve 125 for controlling the hydraulic pressure of the wheel cylinder 115 of the wheel FR and with a pressure-increasing control valve 122 and a pressure-reducing control valve 126 for controlling the hydraulic pressure of the wheel cylinder 116 of the wheel RL. The second fluid conduit system 111b is provided with a pressure-increasing control valve 123 and a pressure-reducing control valve 127 for controlling the hydraulic pressure of the wheel cylinder 117 of the wheel RR and with a pressure-increasing control valve 124 and a pressure-reducing control valve 28 for controlling the hydraulic pressure of the wheel cylinder 118 of the wheel FL.

The first fluid conduit system 111a will be explained in detail.

It is provided with a master cylinder cut-off valve (SMC valve) 131 for communicating/cutting off a fluid path 145a on the side of the master cylinder 101 from each of the increasing valves 121 and 122. A pressure regulating valve 142 is disposed on the side of the master cylinder 101 from the SMC valve 131. The pressure regulating valve 142 is what a known proportioning control valve is inversely connected. The proportioning control valve is normally connected so that high pressure brake fluid is supplied from a master cylinder to the proportioning control valve and low pressure brake fluid attenuated with a predetermined ratio thereby is provided to a wheel cylinder, when the brake fluid pressure supplied from the master cylinder has reached a split-point pressure. Therefore, when the proportioning control valve is inversely connected, it is possible to increase the hydraulic pressure of the fluid path 145a side of the pressure regulating valve 142 more than that of the master cylinder 101 side thereof with a predetermined ratio when a hydraulic pump 138 is driven (while the SRC valve 131 is opened) to discharge brake fluid having high pressure into the fluid path 145a. That is, the proportioning control valve inversely connected has an effect of causing the brake fluid to flow from the side of the wheel cylinders 115 through 118 to the side of the master cylinder 101 while attenuating the pressure with the predetermined ratio when the brake fluid pressure on the side of the wheel cylinders 115 through 118 increases more than the split-point pressure of the proportioning control valve. Therefore, the brake fluid pressure applied to the wheel cylinders 115 through 118 may be maintained to be higher than the pressure of the master cylinder 101.

The first fluid conduit system 111a is also provided with a reservoir 136 for temporarily storing the brake fluid discharged from each of the pressure-reducing control valves 125 and 126 and a hydraulic pump 138 for pressurizing and feeding the brake fluid to the fluid path 145a. It is noted that an accumulator 147 for suppressing pulsations of the internal hydraulic pressure is provided in the path for discharging the brake fluid from the hydraulic pump 138. The first fluid conduit system 111a is also provided with a fluid path 149a for supplying the brake fluid directly from the master cylinder 101 to the hydraulic pump 134 to increase the pressure of the wheel cylinders. A cut-off valve (SRC valve) 134 for communicating/cutting off the fluid path 149a is provided in the fluid path 149a.

Similarly to the first fluid conduit system 111a described above, the second fluid conduit system 111b is provided with pressure-increasing control valves 123 and 124, pressure-reducing control valves 127 and 128, a SMC valve 132, a reservoir 137, a hydraulic pump 139, an accumulator 148, a SRC valve 135, a pressure regulating valve 143 and the like at the same locations.

It is noted that the both hydraulic pumps 138 and 139 are arranged so as to be linked with and driven by an electrically driven pump motor 141.

As shown in FIG. 6, an ECU 150 for controlling the vehicular brake system described above is mainly composed of a microcomputer equipped with a known CPU 150a, a ROM 150b, a RAM 150c, an input/output section 150d, a bus line 150e and the like.

Signals of wheel speed sensors 153 disposed at each wheel, of a stop switch 154 for detecting that the brake pedal 103 has been depressed, of a M/C pressure sensor 146 for detecting the pressure of the master cylinder 101, of a vacuum chamber pressure sensor 148 for detecting the pressure within the vacuum chamber 104 (to detect whether the brake booster 2 fails or not) of others are input to the ECU 150. The ECU 150 outputs signals for controlling the pressure-increasing control valves 121 through 124, the pressure-reducing control valves 125 through 128 and the SMC valves 131 and 132, which are electromagnetic valves, and a signal for driving control actuators such as the electrically driven pump motor 141.

Next, control processing steps of the sixth embodiment will be explained based on FIGS. 7 through 12.

Figure 7:
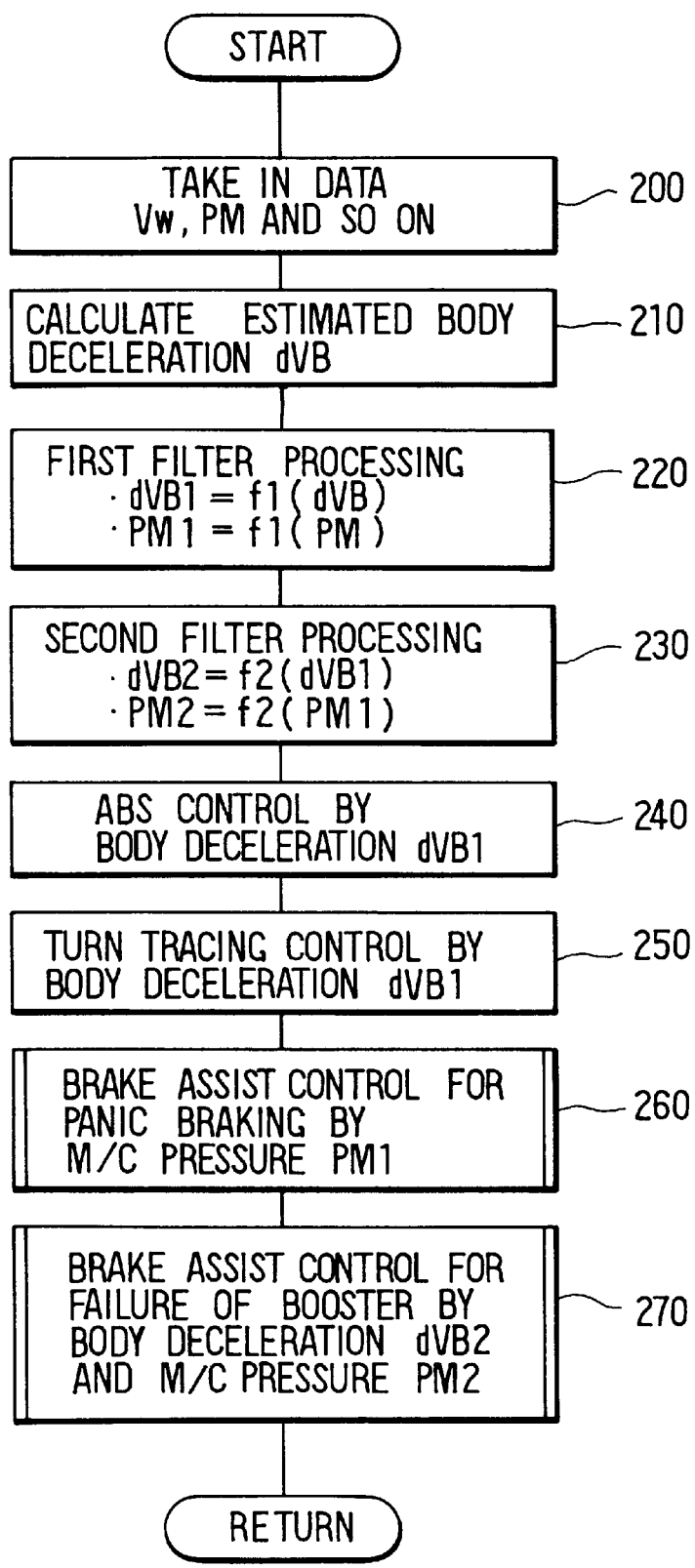
FIG. 7 is a flow chart showing control processing steps of the sixth embodiment.

At first, a main flow chart will be explained based on FIG. 7. Data is taken in from each sensor in Step 200 in FIG. 7. For example, wheel speeds VW of each wheel are detected based on the signal from the speed sensors 153 and a master cylinder pressure (M/C pressure) PM is detected based on the signal from the M/C pressure sensor 146.

Figure 8A:
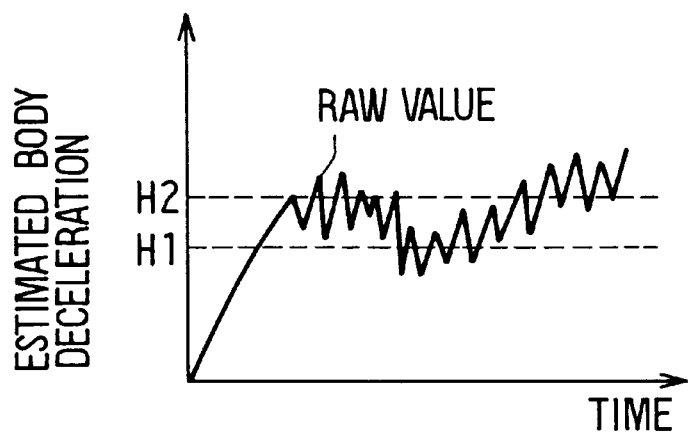
FIGS. 8A, 8B and 8C are graphs showing changes of estimated body deceleration before and after filter processing.

In the following Step 210, a selected value among the wheel speeds VW (e.g. an average value of the wheel speeds VW) is set as a vehicle body speed VB and the vehicle-body speed VB is differentiated to calculate an estimated deceleration of the vehicle body (estimated body deceleration) dVB. FIG. 8A shows changes of the estimated body deceleration dVB. It can be seen that the estimated body deceleration dVB changes sharply crossing first and second reference values H1 and H2 used in control described later because it is a raw value.

Figure 8B:
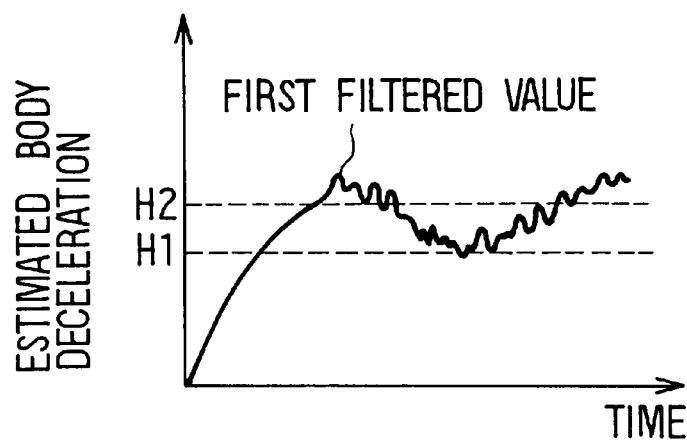

In the following Step 220, a first filter processing is carried out by filtering the values of the estimated body deceleration dVB and the M/C pressure PM by using a normal (first) filter. First filtered values of the estimated body deceleration dVB1 and the M/C pressure PM1 are derived by this first filter processing. It is noted that the subscript 1 denotes the first filtered value and the first filter has a property in which variations of individual data of a signal are reflected in a resultant filtered value to some extent. FIG. 8B shows changes of the estimated body deceleration dVB1 to which the first filter processing has been carried out. It can be seen that the changes of the filtered estimated body deceleration dVB1 is smoothened comparing to the changes of the raw values of the estimated body deceleration dVB shown in FIG. 8A.

Figure 8C:
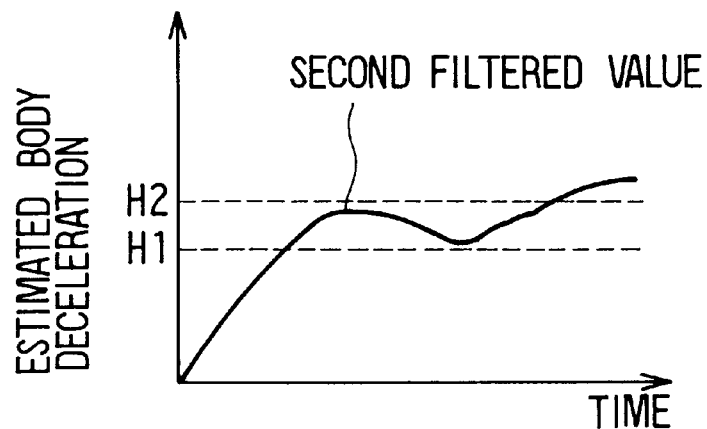

In the following Step 230, a second filter processing is carried out with respect to the first filtered values of the estimated body deceleration dVB1 and the M/C pressure PM1 by using a second filter having a property in which variations of individual data of a signal is less reflected in the resultant filtered value than the normal filter. Thereby, an estimated body deceleration dVB2 and a M/C pressure PM2 which are second filtered values are further smoothened than the first filtered values as shown in FIGS. 8B and 8C. It is noted that the subscript 2 denotes the second filtered value. That is, FIG. 8C shows changes of the estimated body deceleration dVB2 to which the second filter processing has been carried out. It can be seen from FIGS. 8B and 8C that the changes of the estimated body deceleration dVB2 to which the second filter processing is carried out are smoother than the changes of the estimated body deceleration dVB1 to which the first filter processing is carried out.

Figure 9A:
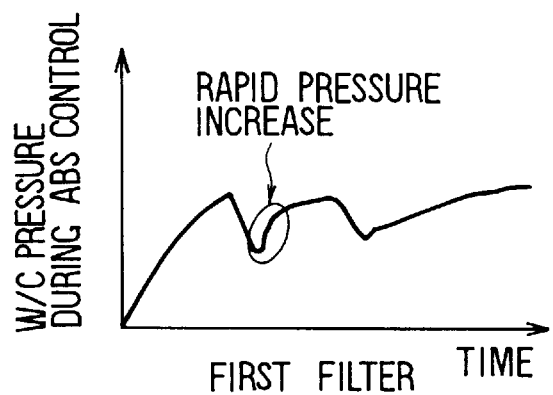
FIGS. 9A and 9B are graphs showing changes of W/C pressure during ABS control.

In the following Step 240, the known anti-skid control (ABS control) is carried out by using the estimated body deceleration which is the first filtered value. The known ABS control for enhancing the braking performance is executed when the predetermined conditions for performing ABS control are fulfilled (e.g. a slip ratio of a wheel is more than a predetermined value and so on). In this ABS control, the wheel cylinder pressure (W/C pressure) is increased when the estimated body deceleration dVB1 is smaller than the first reference value H1 shown in FIG. 8B for example because the deceleration of the vehicle is small and an increase of the wheel cylinder pressure is required. Specifically, when the normal filter shown in FIG. 8B is used, i.e. when the estimated body deceleration dVB1 which is the first filtered value is used, ABS control is made so as to increase a great amount of the W/C pressure when the estimated body deceleration dVB1 lowers below the first reference value H1 and to increase a small amount of the W/C pressure (or hold the W/C pressure) when it exceeds the first reference value H1. This control causes the braking performance to enhance because the W/C pressure may be ideally (quickly) increased as shown in FIG. 9A after the W/C pressure has been reduced.

Figure 9B:
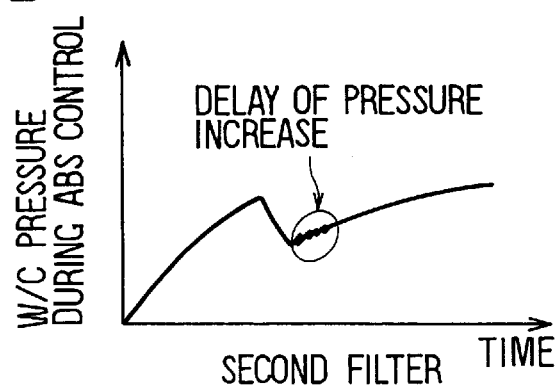

When the second filter shown in FIG. 8C is used, i.e. when the estimated body deceleration dVB2 which is the second filtered value is used, on the other hand, the W/C pressure cannot be increased ideally. That is, the rate of the pressure increase is slow and the deceleration of the vehicle body drops as a result as shown in FIG. 9B even when the similar control is made based on the first reference value H1. This is because the estimated body deceleration dVB2 does not lower below the first reference value H1 as the result that the second filter processing excessively has smoothened the estimated body deceleration dVB.

In the following Step 250, turn tracing control for controlling the behavior of the vehicle when the vehicle is turning is executed by using the estimated body deceleration dVB1 and the M/C pressure PM1 which are the first filtered values. In detail, when predetermined conditions for performing turn tracing control are satisfied, e.g. when it is determined that the vehicle has entered an over-steer mode from detected values of the wheel speed sensors 53, a yaw rate sensor or a body lateral acceleration sensor, and a steering angle sensor, turn tracing control for controlling the behavior of the vehicle is executed so that the vehicle traces a target turning line by providing brake fluid pressure to each of the wheel cylinders, independently. In this turn tracing control, when the driver depresses the brake pedal 103, a target deceleration is set based on the M/C pressure PM1 which is the first filtered value. Then, the wheel cylinder pressure of each of the wheels is regulated so that the estimated body deceleration dVB1 which is the first filtered value becomes equal to the target deceleration. In this way, turn tracing control controls the behavior of the turning vehicle while decelerating the vehicle at the target deceleration corresponding to the driver's brake pedal operation. That is, the estimated body deceleration dVB1 and the M/C pressure PM1 which are the first filtered values are used for turn tracing control, similarly to a case of ABS control.

In Step 260, when conditions for executing brake assist (B/A) control for a panic braking are satisfied, the brake assist control for the panic braking is executed by using the M/C pressure PM1 which is the first filtered value. Brake assist control for the panic braking will be described later in detail.

In Step 270, when conditions for executing brake assist control for compensating the failure of the brake booster 102 are satisfied, brake assist control for compensating the failure of the brake booster 102 is started by using the estimated body deceleration dVB2 and the M/C pressure PM2 which are the second filtered values. Brake assist control for compensating the failure of the brake booster 102 will be also described later. This routine is then finished.

Figure 10:
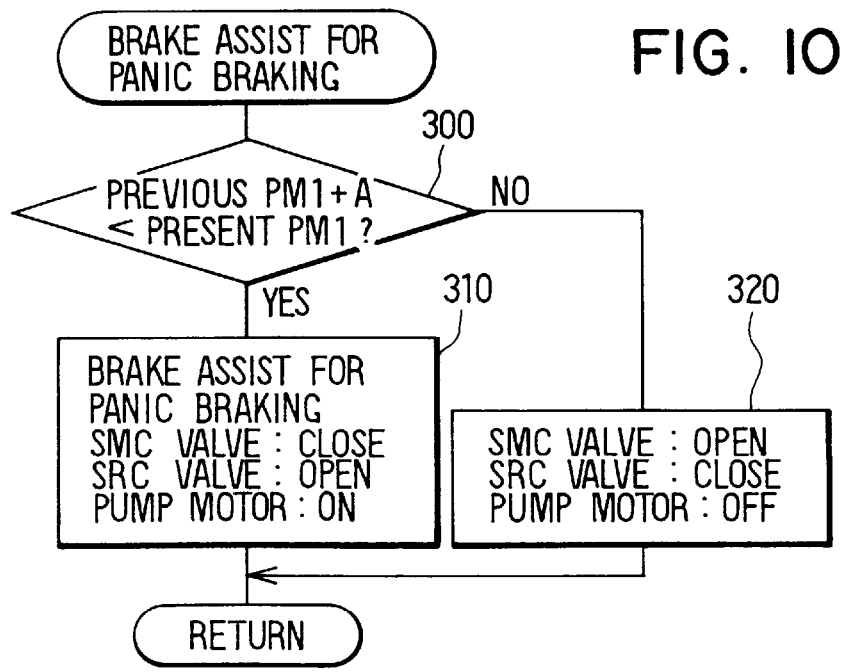
FIG. 10 is a flow chart showing control processing steps of brake assist control during panic braking operation.

Next, the processing of brake assist control for the panic braking which is the processing in Step 260 will be explained based on a flow chart in FIG. 10. In Step 300 in FIG. 10, it is determined whether the panic braking is being carried out or not based on the M/C pressure PM1 which is the first filtered value. In detail, because it is assumed that the panic braking operation is made when the M/C pressure increases sharply, it is determined whether or not the M/C pressure PM1 of this control cycle is greater than the M/C pressure PM1 of previous control cycle plus a predetermined value A. When it is determined to be Yes here, it is assumed that the panic braking operation is made and the processing advances to Step 310. When it is determined to be No on the other hand, the processing advances to Step 320.

In Step 310, pressure amplifying brake assist control is executed to increase the W/C pressure. In detail, the SMC valves 131 and 132 are turned on and closed, the SRC valves 134 and 135 are turned on to open, and the pump motor 141 is turned on to drive the hydraulic pumps 138 and 139 to increase the W/C pressure quickly. In Step 320 on the other hand, pressure amplifying brake assist control is not executed (or halted). In detail, the SMC valves 131 and 132 are turned off to open, the SRC valves 134 and 135 are turned off to close, and the pump motor 141 is turned off to stop the hydraulic pumps 138 and 139. As a result, increasing of the W/C pressure is stopped.

As described above, because it is necessary to increase the W/C pressure quickly during the panic braking, brake assist control is executed using the first filtered values to enhance the braking performance as explained before with reference to FIG. 9A.

The processing of brake assist control for the failure of the brake booster 102, i.e. the processing in Step 270, will be explained based on a flow chart in FIG. 11 and explanatory graphs in FIGS. 12A and 12B.

Figure 11:
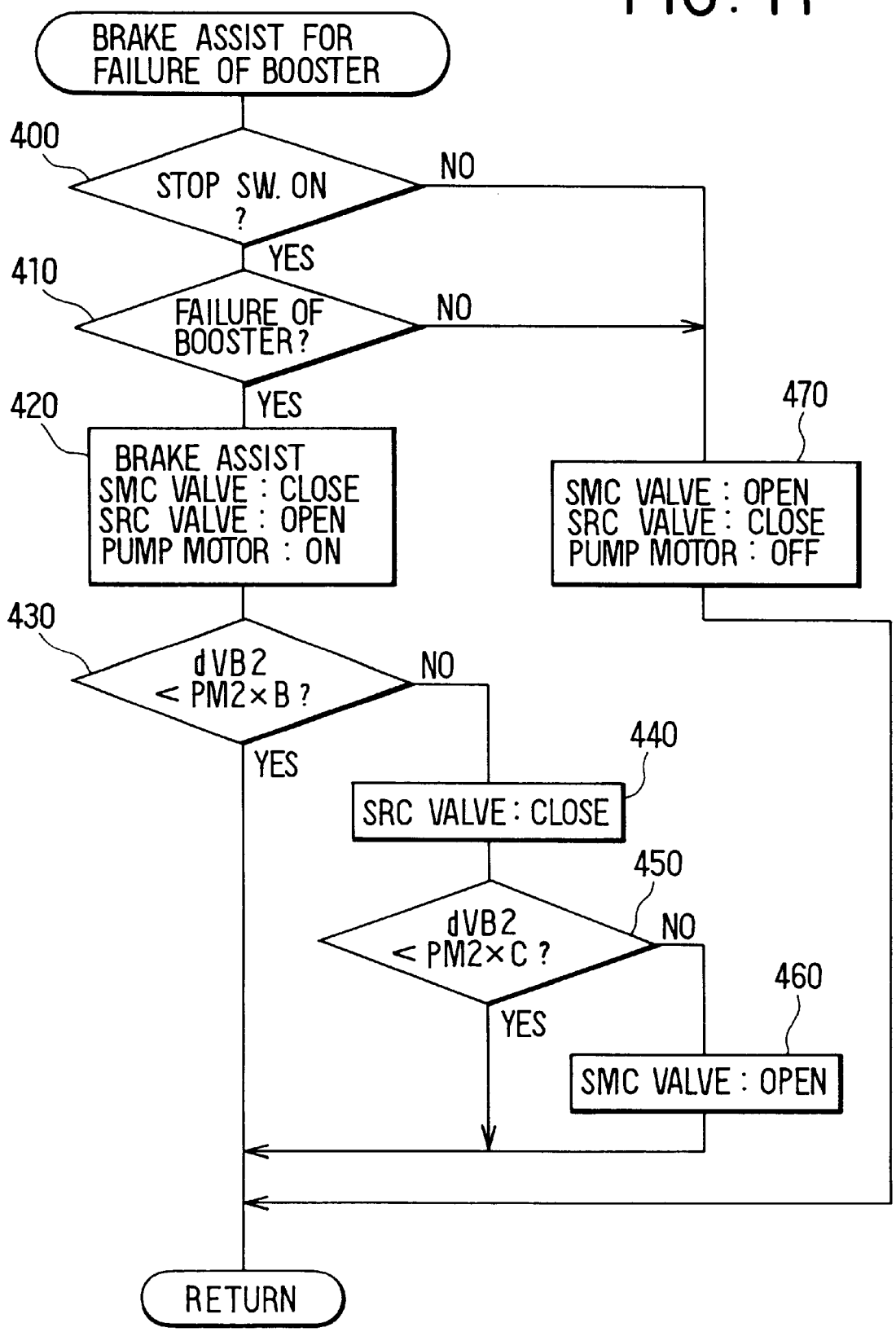
FIG. 11 is a flow chart showing control processing steps of brake assist control when a brake booster fails.
Figure 12A:
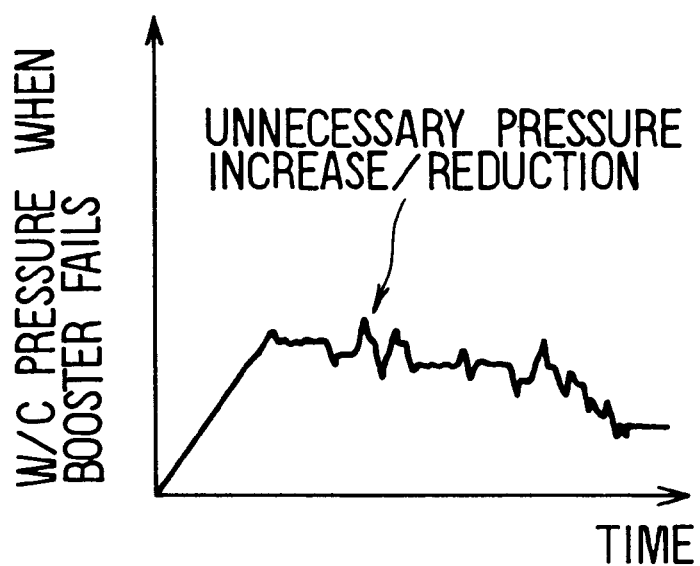
FIGS. 12A and 12B are graphs showing changes of W/C pressure when the brake booster fails.

In Step 400 in FIG. 11, it is determined whether or not the brake pedal 103 is being depressed by determining whether or not the stop switch 154 is ON. When it is determined to be Yes here, the processing advances to Step 410 and when it is determined to be No on the other hand, the processing advances to Step 470. Because pressure amplifying brake assist control for increasing the W/C pressure is not executed in Step 470, the SMC valves 131 and 132 are turned off to open, the SRC valves 134 and 135 are turned off to close and the pump motor 141 is turned off to stop (to prohibit) increasing the W/C pressure. Then, this routine is finished. In Step 410, it is determined whether or not the brake booster 102 fails based on the signal from the vacuum chamber pressure sensor 148. That is, it is determined whether or not the brake booster 102 fails by determining whether or not the vacuum pressure P of the vacuum chamber 104 exceeds a determination value kP. When no adequate vacuum is supplied to the vacuum chamber 104, it is determined that the brake booster 102 fails. When it is determined to be Yes here, the processing advances to Step 420 and when it is determined to be No, the processing advances to Step 470 described above.

It is noted that a deterioration of the brake booster function which will not be a complete failure of the brake booster may be also detected by setting the level of the determination value low, i.e. by setting the value for discriminating the deterioration of the function lower than the value of kP. The brake fluid pressure may be amplified in the same manner with the case of the failure of the brake booster 102 in response to the determination result that the function of the brake booster 102 has deteriorated (however, the degree of amplification of the pressure is small).

Because the brake booster 102 fails, pressure amplifying brake assist control for the failure of the brake booster 102 is executed in Step 420 to increase the W/C pressure. In detail, the SMC valves 131 and 132 are turned on to close, the SRC valves 134 and 135 are turned on to open and the pump motor 141 is turned on to drive the hydraulic pumps 138 and 139 in order to increase the W/C pressure quickly.

In the following Step 430, it is determined how close the actual estimated body deceleration dVB has approached to the target value based on the estimated body deceleration dVB2 and the M/C pressure PM2 which are the second filtered values. That is, it is determined whether or not the estimated body deceleration dVB2<(M/C pressure PM2×B). It is noted that B is a constant value. Because the M/C pressure PM2 is a value indicative of that how strong the brake pedal 103 is being depressed, it indicates a target deceleration indirectly. Accordingly, when the estimated body deceleration dVB2 is smaller than the (M/C pressure PM2×B), the body deceleration dVB is not so large. Therefore, pressure amplifying brake assist control must be continued.

When it is determined to be Yes here, the pressure amplifying brake assist control is continued as it is and when it is determined to be No on the other hand, the processing advances to Step 440. Because it has been determined that the estimated body deceleration dVB2 is greater than the (M/C pressure PM2×B) and therefore it can be considered that the body deceleration is relatively large in Step 430, the processing for turning off and closing the SRC valves 134 and 135 is carried out in order to reduce the body deceleration dVB in Step 440. That is, when the SRC valves 134 and 135 are closed, the degree of the amplification of the pressure by the pumps 138 and 139 is weakened, so that the body deceleration may be reduced. The processing corresponds to control for maintaining the W/C pressure as a matter of fact.

In the following Step 450, it is determined how close the actual estimated body deceleration dVB has approached to the target value based on the estimated body deceleration dVB2 and the M/C pressure PM2 which are the second filtered values. That is, it is determined whether or not the estimated body deceleration dVB2<(M/C pressure PM2×C). It is noted that C is a constant (B<C). Because the M/C pressure PM2 is a value indicative of that how strong the brake pedal 103 is being depressed, it indicates a target deceleration indirectly as described above. Accordingly, when the estimated body deceleration dVB2 is smaller than the (M/C pressure PM2×C), it indicates that although the body deceleration may be greater than the case when it has been determined to be Yes in Step 430 described above, it is smaller than the target deceleration, indicating that the SRC valves 134 and 135 should be continuously closed. When it is determined to be Yes here, the state in which only the SRC valves 134 and 135 are turned off is continued as it is and when it is determined to be No on the other hand, the processing advances to Step 460.

In Step 460, because it has been determined in Step 450 that the estimated body deceleration dVB2 is greater than the (M/C pressure PM2×C) and it can be considered that the body deceleration is too large, the processing for turning off and opening the SMC valves 131 and 132 is carried out in order to reduce the body deceleration further. That is, when the SMC valves 131 and 132 are opened, the degree of the amplification of the pressure by the hydraulic pumps 138 and 139 is weakened further, so that the body deceleration may be reduced further. The processing corresponds to the W/C pressure reducing control as a matter of fact.

In brake assist control for compensating the failure of the brake booster 102, the W/C pressure is reduced when the estimated body deceleration dVB exceeds the second reference value H2, the W/C pressure is maintained when it is less than the second reference value H2 and is more than the first reference value H1, and the W/C pressure is increased when it is less than the first reference value H1. Therefore, when the normal (first) filter shown in FIG. 8B is used, i.e. the estimated body deceleration dVB1 (and the corresponding M/C pressure PM1) which is the first filtered value is used, in the above-mentioned pressure amplifying brake assist control for compensating the failure of the brake booster 102, the unnecessary increase/decrease of the W/C pressure is made as shown in FIG. 12A.

Figure 12B:
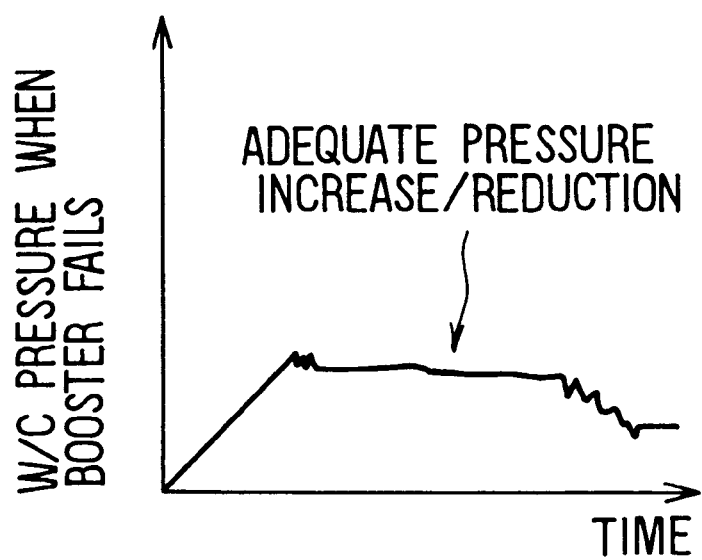

When the second filter shown in FIG. 8C is used, i.e. when the estimated body deceleration dVB2 (and the corresponding M/C pressure PM2) which is the second filtered value is used, on the other hand, the unnecessary increase/decrease of the pressure is less made as shown in FIG. 12B when brake assist control is similarly carried out based on the first and second reference values H1 and H2, allowing to obtain a preferable braking performance.

It is noted that the present invention is not limited to the above-mentioned sixth embodiment and it may be modified in various ways within the scope of the appended claims.

For instance, three filters may be utilized. A first filter smoothens the variations of individual data of a signal most. A second filter smoothens them intermediately. A third filter smoothens them least. The filtered value which is filter-processed by the first filter is used for brake assist control for compensating the failure of the brake booster 102. The filtered value which is filter-processed by the second filter is used for ABS control and turn tracing control. And the filtered value which is filter-processed by the third filter is used for brake assist control for the panic braking. It is because brake assist control for the panic braking has to be started (increase the wheel cylinder pressure) as soon as possible, compared to the adjustment (increase) of the wheel cylinder pressure during ABS control and turn tracing control. Further, because the quick response during brake assist control for the failure of the brake booster increases the unnecessary pressure increasing/reducing operation for the wheel cylinder pressure, vibrations of the pedal occur thereby giving a bad pedal feeling to the driver.

The fine filter having the property in which variations of individual data of a signal is less reflected in the resultant filtered value can be realized by the following methods (F) to (I).

(F) The fine filter can be obtained by narrowing a frequency band (frequency width) of a band-pass filter when each sensor output signal or a computed value by the CPU passes through the band-pass filter.

(G) When the CPU carries out the calculation for the filter processing and a filtered value of the normal filter is calculated by putting a first predetermined weight (for example 90%) to a previous filtered value and a second predetermined weight (for example 10%) to a value based on the sensor output signal at present, variations of the sensor output signal may be smoothened and the fine filter can be realized by putting a larger weight (for example 95%) than the first predetermined weight to the previous filtered value and a smaller weight (for example 5%) than the second predetermined weight to the value based on the sensor output signal at present in the filter processing.

(H) When a low-pass filter is used, the cut-off frequency thereof is lowered to get the fine filter.

(I) When the CPU carries out the calculation for the filter processing and a filtered value of the normal filter is calculated by averaging one previous filtered value and a value based on a sensor output signal at present, the fine filter can be realized by averaging, for example, six past filtered values up to the previous one and the value based on the sensor output signal at present so as to increase data to be averaged.

It is noted that the methods (F) through (I) are implemented inversely when a filter having the property in which the variations of individual data in a signal is smoothened in a lesser extent it to be realized.

Further, when the pressure amplifying device (increasing device) is driven in response to the determination that the brake booster fails in the first embodiment to the fifth embodiment, brake assist control described with reference to the flow chart in FIG. 11 may be carried out.

What is claimed is:

1. A vehicular brake system, comprising:
   a brake booster for boosting a brake pedal depressing force when a driver steps on a brake pedal;
   a brake fluid pressure generating device for generating a first brake fluid pressure due to the brake pedal depressing force boosted by a boosting effect of said brake booster;
   a wheel braking force generating device for generating a wheel braking force by receiving the first brake fluid pressure;
   a fluid conduit for communicating said brake fluid pressure generating device with said wheel braking force generating device;
   a first detecting device for detecting at least one of a failure and a deterioration of function of said brake booster;
   a pressure increasing device for increasing a brake fluid pressure applied to said wheel braking force generating device to a second brake fluid pressure which is higher than said first brake fluid pressure when said first detecting device detects at least one of the failure and the deterioration of function of said brake booster;
   a second detecting device for detecting that the vehicle is stopped; and
   a holding device for holding the brake fluid pressure applied to said wheel braking force generating device to be higher than said first brake fluid pressure until a predetermined releasing condition is satisfied when said second detecting device detects that the vehicle is stopped after said pressure increasing device increases the brake fluid pressure applied to said braking force generating device to said second brake fluid pressure.

2. The vehicular brake system according to claim 1, wherein the brake fluid pressure held by said holding device is equal to said second brake fluid pressure generated by said pressure increasing device.

3. The vehicular brake system according to claim 1, wherein said holding device holds the brake fluid pressure applied to said wheel braking force generating device for a predetermined time period since when said second detecting device detects that the vehicle is in a stopped state.

4. The vehicular brake system according to claim 1, wherein said holding device holds the brake fluid pressure applied to said wheel braking force generating device until when an accelerator pedal is depressed to cause the vehicle to start since when said second detecting device detects that the vehicle is in a stopped state.

5. The vehicular brake system according to claim 1, wherein said holding device holds the brake fluid pressure applied to said wheel braking force generating device until when the driver returns said brake pedal since when said second detecting device detects that the vehicle is in a stopped state.

6. The vehicular brake system according to claim 1, wherein said holding device holds the brake fluid pressure applied to said wheel braking force generating device until when the driver operates a parking brake since when said second detecting device detects that the vehicle is in a stopped state.

7. The vehicular brake system according to claim 1, wherein said vehicle has an automatic transmission, and said holding device holds the brake fluid pressure applied to said wheel braking force generating device until when the driver sets a shift lever of said automatic transmission at a position for parking since when said detecting device detects that the vehicle is in a stopped state.

8. A vehicular brake system, comprising:
a brake control member which is controlled by a driver to apply a brake to a vehicle;
a brake fluid pressure generating device for generating a brake fluid pressure in response to an operating state of said brake control member;
a wheel braking force generating device for generating a wheel braking force by receiving the brake fluid pressure from said brake fluid pressure generating device;
a main conduit for communicating said brake fluid pressure generating device with said wheel braking force generating device;
a wheel slippage control device for controlling slippage of a wheel;
a brake assist control device for generating a brake fluid pressure which exhibits a wheel braking force greater than a wheel braking force corresponding to said operating state of said brake control member and controlling brake fluid pressure applied to said wheel braking force generating device by use of said brake fluid pressure generated;
a first filter having a property in which variations of individual data of a data signal is reflected in a resultant filtered value to some extent, said first filter carrying out filter-processing with respect to a predetermined data signal utilized for performing wheel slippage control; and
a second filter having a property in which variations of individual data of a data signal is less reflected in a resultant filtered value than said first filter, said second filter carrying out filter processing with respect to a predetermined data signal utilized for performing brake assist control.

9. A vehicular brake system, comprising:
a brake control member which is controlled by a driver to apply a brake to a vehicle;
a brake fluid pressure generating device for generating a brake fluid pressure in response to an operating state of said brake control member;
a wheel braking force generating device for generating a wheel braking force by receiving the brake fluid pressure from said brake fluid pressure generating device;
a main conduit for communicating said brake fluid pressure generating device with said wheel braking force generating device;
a wheel slippage control device for controlling a wheel slippage state;
a brake assist control device for generating a brake fluid pressure which exhibits a wheel braking force greater than a wheel braking force corresponding to said operating state of said brake control member and controlling brake fluid pressure applied to said wheel braking force generating device by use of said brake fluid pressure generated;
a first filter having a property in which variations of individual data of a data signal is reflected in a resultant filtered value to some extent, said first filter carrying out filter-processing with respect to a data signal indicating a vehicle body deceleration utilized for performing wheel slippage control; and
a second filter having a property in which variations of individual data of a data signal is less reflected in a resultant filtered value than said first filter, said second filter carrying out filter processing with respect to said data signal indicating said vehicle body deceleration utilized for performing brake assist control.

10. A vehicular brake system, comprising:
a brake control member which is controlled by a driver to apply a brake to a vehicle;
a brake fluid pressure generating device for generating a brake fluid pressure in response to an operating state of said brake control member;
a wheel braking force generating device for generating a wheel braking force by receiving the brake fluid pressure from said brake fluid pressure generating device;
a main conduit for communicating said brake fluid pressure generating device with said wheel braking force generating device;
a turn tracing control device for controlling a turning behavior of a vehicle;
a brake assist control device for generating a brake fluid pressure which exhibits a wheel braking force greater than a wheel braking force corresponding to said operating state of said brake control member and controlling brake fluid pressure applied to said wheel braking force generating device by use of said brake fluid pressure generated;
a first filter having a property in which variations of individual data of a data signal is reflected in a resultant filtered value to some extent, said first filter carrying out filter-processing with respect to a data signal indicating a vehicle body deceleration which is one of data signals utilized for performing turn tracing control; and
a second filter having a property in which variations of individual data of a data signal is less reflected in a resultant filtered value than said first filter, said second filter carrying out filter processing with respect to said data signal indicating said vehicle body deceleration utilized for performing brake assist control.

11. A vehicular brake system, comprising:
a brake control member which is controlled by a driver to apply a brake to a vehicle;
a brake fluid pressure generating device for generating a brake fluid pressure in response to an operating state of said brake control member;

a wheel braking force generating device for generating a wheel braking force by receiving the brake fluid pressure from said brake fluid pressure generating device;

a main conduit for communicating said brake fluid pressure generating device with said wheel braking force generating device;

a brake booster for boosting an operating force applied to said brake control member by said driver and transmitting a boosted operating force to said brake fluid pressure generating device;

a brake assist control device for carrying out first brake assist control by generating a brake fluid pressure higher than the brake fluid pressure generated by said brake fluid pressure generating device in response to said operating state of said brake control member and increasing brake fluid pressure applied to said wheel braking force generating device by use of said brake fluid pressure generated when a panic braking operation is made by the driver and for carrying out second brake assist control by generating a brake fluid pressure higher than the brake fluid pressure generated by said brake fluid pressure generating device in response to said operating state of said brake control member and increasing brake fluid pressure applied to said wheel braking force generating device by use of said brake fluid pressure generated when said brake booster fails or its function deteriorates;

a first filter having a property in which variations of individual data of a data signal is reflected in a resultant filtered value to some extent, said first filter carrying out filter-processing with respect to a predetermined data signal utilized for performing first brake assist control; and a second filter having a property in which variations of individual data of a data signal is less reflected in a resultant filtered value than said first filter, said second filter carrying out filter processing with respect to said predetermined data signal utilized for performing second brake assist control.

12. The vehicular brake system according to claim 11, wherein said predetermined data signal is a signal indicating a master cylinder pressure.

* * * * *